(12) United States Patent
Park et al.

(10) Patent No.: US 12,446,053 B2
(45) Date of Patent: Oct. 14, 2025

(54) METHOD AND APPARATUS FOR RESELECTING SIDELINK TRANSMISSION RESOURCE IN NR V2X

(71) Applicant: LG ELECTRONICS INC., Seoul (KR)

(72) Inventors: Giwon Park, Seoul (KR); Youngdae Lee, Seoul (KR); Jongyoul Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 399 days.

(21) Appl. No.: 18/007,508

(22) PCT Filed: May 31, 2021

(86) PCT No.: PCT/KR2021/006709
§ 371 (c)(1),
(2) Date: Dec. 1, 2022

(87) PCT Pub. No.: WO2021/246729
PCT Pub. Date: Dec. 9, 2021

(65) Prior Publication Data
US 2023/0199809 A1  Jun. 22, 2023

(30) Foreign Application Priority Data

Jun. 3, 2020 (KR) .................. 10-2020-0067142
Jun. 3, 2020 (KR) .................. 10-2020-0067151
Jun. 3, 2020 (KR) .................. 10-2020-0067158

(51) Int. Cl.
*H04W 72/40* (2023.01)
*H04L 1/1812* (2023.01)
*H04W 72/566* (2023.01)

(52) U.S. Cl.
CPC .......... *H04W 72/40* (2023.01); *H04L 1/1812* (2013.01); *H04W 72/566* (2023.01)

(58) Field of Classification Search
CPC ... H04W 72/40; H04W 72/566; H04W 72/02; H04W 72/0446; H04W 72/10;
(Continued)

(56) References Cited

U.S. PATENT DOCUMENTS

2020/0146066 A1   5/2020  Nguyen et al.
2020/0236656 A1*  7/2020  Cao ..................... H04W 76/27
(Continued)

FOREIGN PATENT DOCUMENTS

WO   2018/084608 A2   5/2018
WO   2020/089317 A1   5/2020

OTHER PUBLICATIONS

WO 2021/012167 A1 (Year: 2021).*
(Continued)

*Primary Examiner* — Rushil P. Sampat
(74) *Attorney, Agent, or Firm* — BRYAN CAVE LEIGHTON PAISNER LLP

(57) ABSTRACT

According to an embodiment of the present disclosure, provided is a method by which a first apparatus performs sidelink communication. The method includes the steps of: reserving a plurality of first sidelink transmission resources for transmitting a PSCCH and a PSSCH to a second apparatus; transmitting the PSCCH and the PSSCH to the second apparatus through at least one of the plurality of first sidelink transmission resources; on the basis of a failure of the second apparatus to decode sidelink data included in the PSSCH, reselecting a plurality of second sidelink transmission resources for transmitting the sidelink data; and transmitting the sidelink data to the second apparatus on the basis of the plurality of second sidelink transmission resources.

14 Claims, 21 Drawing Sheets

(58) Field of Classification Search
CPC ..... H04W 72/56; H04W 72/21; H04W 72/23; H04L 1/1812
See application file for complete search history.

(56) References Cited

U.S. PATENT DOCUMENTS

2021/0144736 A1* 5/2021 Li .......................... H04W 76/14
2022/0110095 A1* 4/2022 Zhao ................. H04W 72/0446

OTHER PUBLICATIONS

R1-1907136, 3GPP TSG-RAN WG1, Meeting #97, Reno, US, May 13-17, 2019, Agenda Item: 7.2.4.2.2, Source: Ericsson, Title: Resource allocation for Mode-2 transmissions, Document for: Discussion, Decision, 19 pages.
R1-2002325, 3GPP TSG-RAN WG1 #100bis, e-Meeting, Apr. 20-30, 2020, Agenda Item: 7.2.4.2.2, Source: Apple, Title: On Remaining Details of Resource Allocation for Mode 2, Document for: Discussion/Decision, 7 pages.

* cited by examiner

METHOD AND APPARATUS FOR RESELECTING SIDELINK TRANSMISSION RESOURCE IN NR V2X

CROSS-REFERENCE TO RELATED APPLICATIONS

This application is the National Stage filing under 35 U.S.C. 371 of International Application No. PCT/KR2021/006709, filed on May 31, 2021, which claims the benefit of Korean Patent Application No. 10-2020-0067142 filed on Jun. 3, 2020, Korean Patent Application No. 10-2020-0067151 filed on Jun. 3, 2020, and Korean Patent Application No. 10-2020-0067158 filed on Jun. 3, 2020, which are all hereby incorporated by reference herein in their entirety.

TECHNICAL FIELD

This disclosure relates to a wireless communication system.

BACKGROUND

Sidelink (SL) communication is a communication scheme in which a direct link is established between User Equipments (UEs) and the UEs exchange voice and data directly with each other without intervention of an evolved Node B (eNB). SL communication is under consideration as a solution to the overhead of an eNB caused by rapidly increasing data traffic. Vehicle-to-everything (V2X) refers to a communication technology through which a vehicle exchanges information with another vehicle, a pedestrian, an object having an infrastructure (or infra) established therein, and so on. The V2X may be divided into 4 types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

Meanwhile, as a wider range of communication devices require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive Machine Type Communication (MTC), Ultra-Reliable and Low Latency Communication (URLLC), and so on, may be referred to as a new radio access technology (RAT) or new radio (NR). Herein, the NR may also support vehicle-to-everything (V2X) communication.

FIG. 1 is a drawing for describing V2X communication based on NR, compared to V2X communication based on RAT used before NR. The embodiment of FIG. 1 may be combined with various embodiments of the present disclosure.

Regarding V2X communication, a scheme of providing a safety service, based on a V2X message such as Basic Safety Message (BSM), Cooperative Awareness Message (CAM), and Decentralized Environmental Notification Message (DENM) is focused in the discussion on the RAT used before the NR. The V2X message may include position information, dynamic information, attribute information, or the like. For example, a UE may transmit a periodic message type CAM and/or an event triggered message type DENM to another UE.

Thereafter, regarding V2X communication, various V2X scenarios are proposed in NR. For example, the various V2X scenarios may include vehicle platooning, advanced driving, extended sensors, remote driving, or the like.

SUMMARY

An object of the present disclosure is to provide a sidelink (SL) communication method between devices (or UEs) and a device (or UE) performing the same.

Another technical problem of the present disclosure is to provide a method for reselecting sidelink transmission resources in NR V2X and a device (or UE) performing the same.

According to an embodiment of the present disclosure, a method for performing, by a first device, wireless communication may be proposed. The method may comprise: reserving a plurality of first sidelink transmission resources for transmitting a physical sidelink control channel (PSCCH) and a physical sidelink shared channel (PSSCH) related to the PSCCH to a second device; transmitting the PSCCH and the PSSCH to the second device, through at least one first sidelink transmission resource among the plurality of first sidelink transmission resources; reselecting a plurality of second sidelink transmission resources for a transmission of sidelink data, based on the second device failing to decode the sidelink data included in the PSSCH through the transmission of the PSCCH and the PSSCH based on the plurality of first sidelink transmission resources; and transmitting the sidelink data to the second device, based on the plurality of second sidelink transmission resources, wherein the PSCCH and the PSSCH may be not transmitted to the second device on at least one second sidelink transmission resource among the plurality of first sidelink transmission resources, based on a first priority related to the sidelink data, and wherein the plurality of second sidelink transmission resources may be reselected, based on the PSCCH and the PSSCH being not transmitted to the second device on the at least one second sidelink transmission resource.

According to an embodiment of the present disclosure, a first device for performing wireless communication may be proposed. The first device may comprise: one or more memories storing instructions; one or more transceivers; and one or more processors connected to the one or more memories and the one or more transceivers, wherein the one or more processors execute the instructions to: reserve a plurality of first sidelink transmission resources for transmitting a physical sidelink control channel (PSCCH) and a physical sidelink shared channel (PSSCH) related to the PSCCH to a second device; transmit the PSCCH and the PSSCH to the second device, through at least one first sidelink transmission resource among the plurality of first sidelink transmission resources; reselect a plurality of second sidelink transmission resources for a transmission of sidelink data, based on the second device failing to decode the sidelink data included in the PSSCH through the transmission of the PSCCH and the PSSCH based on the plurality of first sidelink transmission resources; and transmit the sidelink data to the second device, based on the plurality of second sidelink transmission resources, wherein the PSCCH and the PSSCH may be not transmitted to the second device on at least one second sidelink transmission resource among the plurality of first sidelink transmission resources, based on a first priority related to the sidelink data, and wherein the plurality of second sidelink transmission resources may be reselected, based on the PSCCH and the PSSCH being not transmitted to the second device on the at least one second sidelink transmission resource.

A UE can efficiently perform SL communication.

DESCRIPTION OF EXEMPLARY EMBODIMENTS

Figure 1:
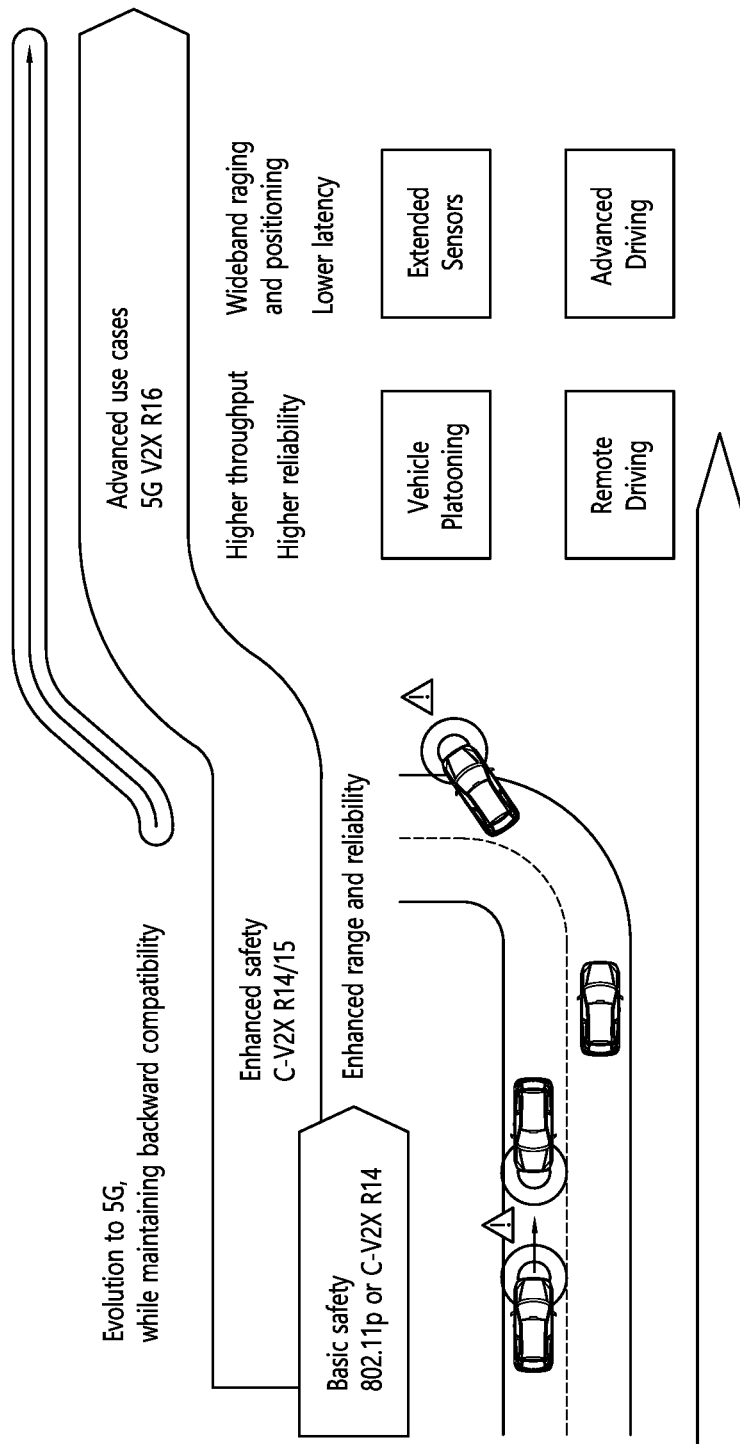
FIG. 1 is a drawing for describing V2X communication based on NR, compared to V2X communication based on RAT used before NR.

In the present specification, "A or B" may mean "only A", "only B" or "both A and B." In other words, in the present specification, "A or B" may be interpreted as "A and/or B".

For example, in the present specification, "A, B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present specification may mean "for example". Specifically, when indicated as "control information (PDCCH)", it may mean that "PDCCH" is proposed as an example of the "control information". In other words, the "control information" of the present specification is not limited to "PDCCH", and "PDCCH" may be proposed as an example of the "control information". In addition, when indicated as "control information (i.e., PDCCH)", it may also mean that "PDCCH" is proposed as an example of the "control information".

A technical feature described individually in one figure in the present specification may be individually implemented, or may be simultaneously implemented.

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A corresponding to a new Clean-slate type mobile communication system having the characteristics of high performance, low latency, high availability, and so on. 5G NR may use resources of all spectrum available for usage including low frequency bands of less than 1 GHz, middle frequency bands ranging from 1 GHz to 10 GHz, high frequency (millimeter waves) of 24 GHz or more, and so on.

For clarity in the description, the following description will mostly focus on LTE-A or 5G NR. However, technical features according to an embodiment of the present disclosure will not be limited only to this.

Figure 2:
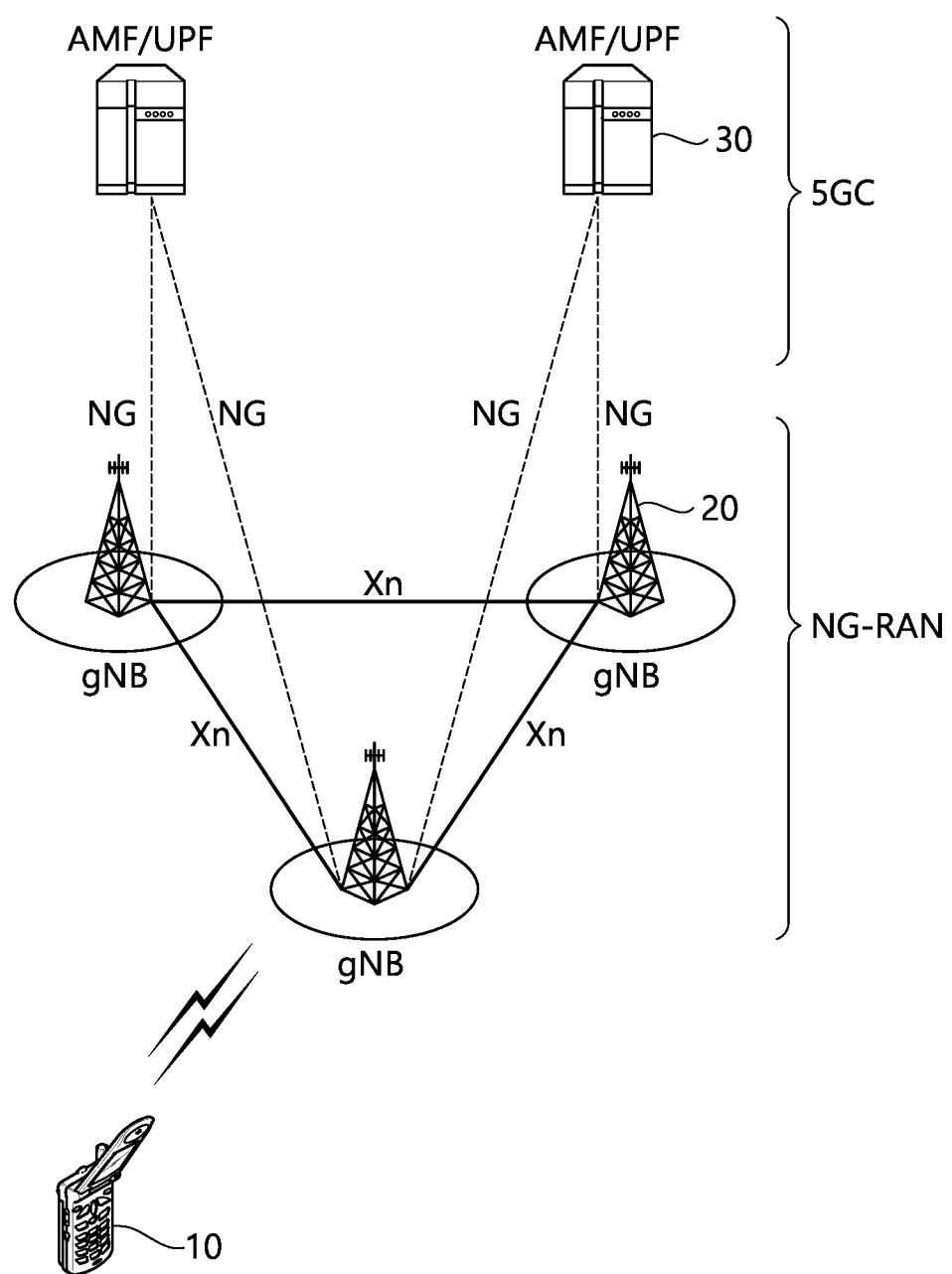
FIG. 2 shows a structure of an NR system, in accordance with an embodiment of the present disclosure.

FIG. 2 shows a structure of an NR system, in accordance with an embodiment of the present disclosure. The embodiment of FIG. 2 may be combined with various embodiments of the present disclosure.

Referring to FIG. 2, a next generation-radio access network (NG-RAN) may include a BS 20 providing a UE 10 with a user plane and control plane protocol termination. For example, the BS 20 may include a next generation-Node B (gNB) and/or an evolved-NodeB (eNB). For example, the UE 10 may be fixed or mobile and may be referred to as other terms, such as a mobile station (MS), a user terminal (UT), a subscriber station (SS), a mobile terminal (MT), wireless device, and so on. For example, the BS may be referred to as a fixed station which communicates with the UE 10 and may be referred to as other terms, such as a base transceiver system (BTS), an access point (AP), and so on.

The embodiment of FIG. 2 exemplifies a case where only the gNB is included. The BSs 20 may be connected to one another via Xn interface. The BS 20 may be connected to one another via 5th generation (5G) core network (5GC) and NG interface. More specifically, the BSs 20 may be connected to an access and mobility management function (AMF) 30 via NG-C interface, and may be connected to a user plane function (UPF) 30 via NG-U interface.

Layers of a radio interface protocol between the UE and the network can be classified into a first layer (layer 1, L1), a second layer (layer 2, L2), and a third layer (layer 3, L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 3:
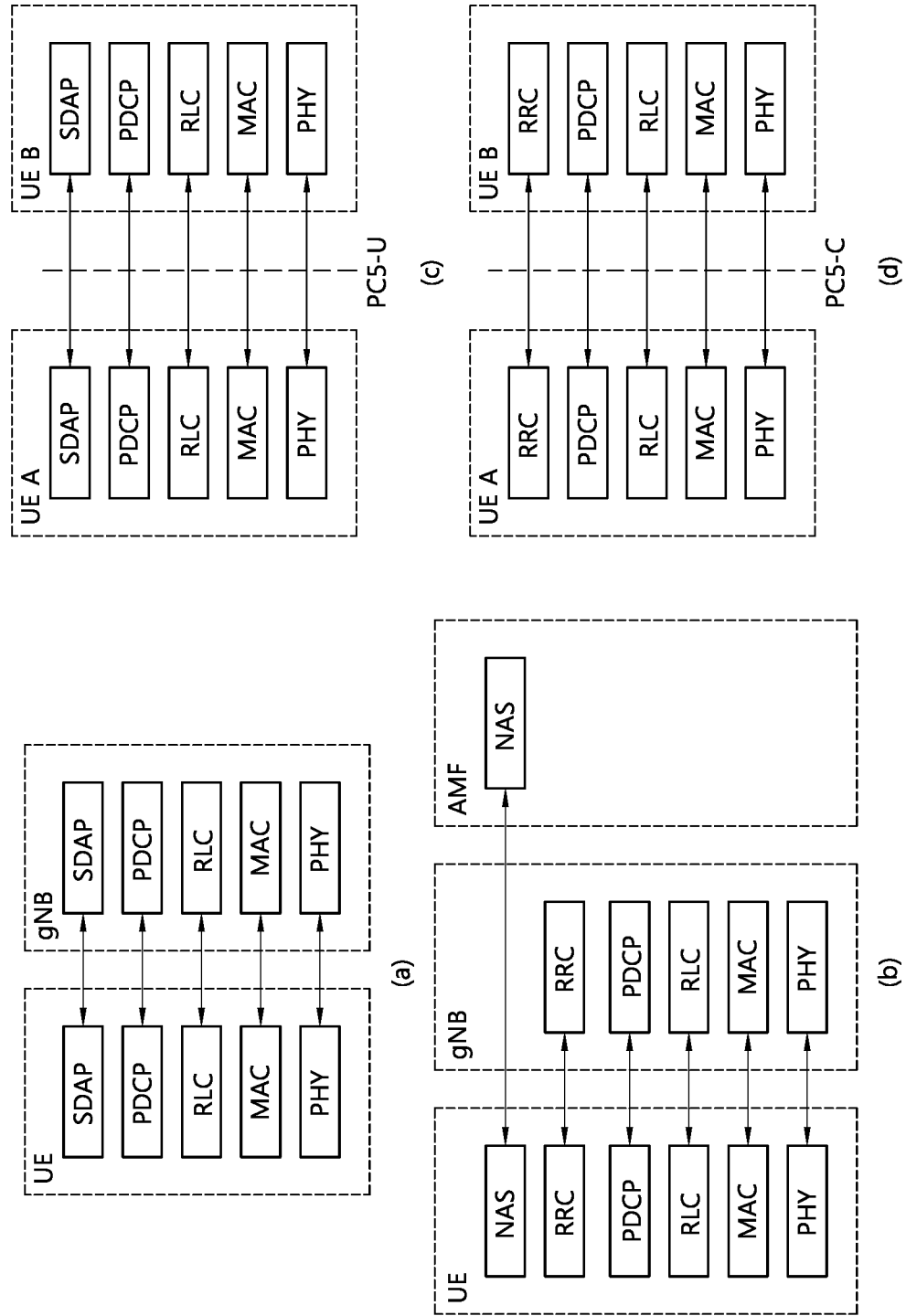
FIG. 3 shows a radio protocol architecture, in accordance with an embodiment of the present disclosure.

FIG. 3 shows a radio protocol architecture, in accordance with an embodiment of the present disclosure. The embodiment of FIG. 3 may be combined with various embodiments of the present disclosure. Specifically, (a) of FIG. 3 shows a radio protocol stack of a user plane for Uu communication, and (b) of FIG. 3 shows a radio protocol stack of a control plane for Uu communication. (c) of FIG. 3 shows a radio protocol stack of a user plane for SL communication, and (d) of FIG. 3 shows a radio protocol stack of a control plane for SL communication.

Referring to FIG. 3, a physical layer provides an upper layer with an information transfer service through a physical channel. The physical layer is connected to a medium access control (MAC) layer which is an upper layer of the physical layer through a transport channel. Data is transferred between the MAC layer and the physical layer through the transport channel. The transport channel is classified according to how and with what characteristics data is transmitted through a radio interface.

Between different physical layers, i.e., a physical layer of a transmitter and a physical layer of a receiver, data are transferred through the physical channel. The physical channel is modulated using an orthogonal frequency division multiplexing (OFDM) scheme, and utilizes time and frequency as a radio resource.

The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of Radio Link Control Service Data Unit (RLC SDU). In order to ensure diverse quality of service (QoS) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

A radio resource control (RRC) layer is defined only in the control plane. The RRC layer serves to control the logical channel, the transport channel, and the physical channel in association with configuration, reconfiguration and release of RBs. The RB is a logical path provided by the first layer (i.e., the physical layer or the PHY layer) and the second layer (i.e., a MAC layer, an RLC layer, a packet data convergence protocol (PDCP) layer, and a service data adaptation protocol (SDAP) layer) for data delivery between the UE and the network.

Functions of a packet data convergence protocol (PDCP) layer in the user plane include user data delivery, header compression, and ciphering. Functions of a PDCP layer in the control plane include control-plane data delivery and ciphering/integrity protection.

A service data adaptation protocol (SDAP) layer is defined only in a user plane. The SDAP layer performs mapping between a Quality of Service (QoS) flow and a data radio bearer (DRB) and QoS flow ID (QFI) marking in both DL and UL packets.

The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the E-UTRAN, the UE is in an RRC_CONNECTED state, and, otherwise, the UE may be in an RRC_IDLE state. In case of the NR, an RRC_INACTIVE state is additionally defined, and a UE being in the RRC_INACTIVE state may maintain its connection with a core network whereas its connection with the BS is released.

Data is transmitted from the network to the UE through a downlink transport channel. Examples of the downlink transport channel include a broadcast channel (BCH) for transmitting system information and a downlink-shared channel (SCH) for transmitting user traffic or control messages. Traffic of downlink multicast or broadcast services or the control messages can be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

Figure 4:
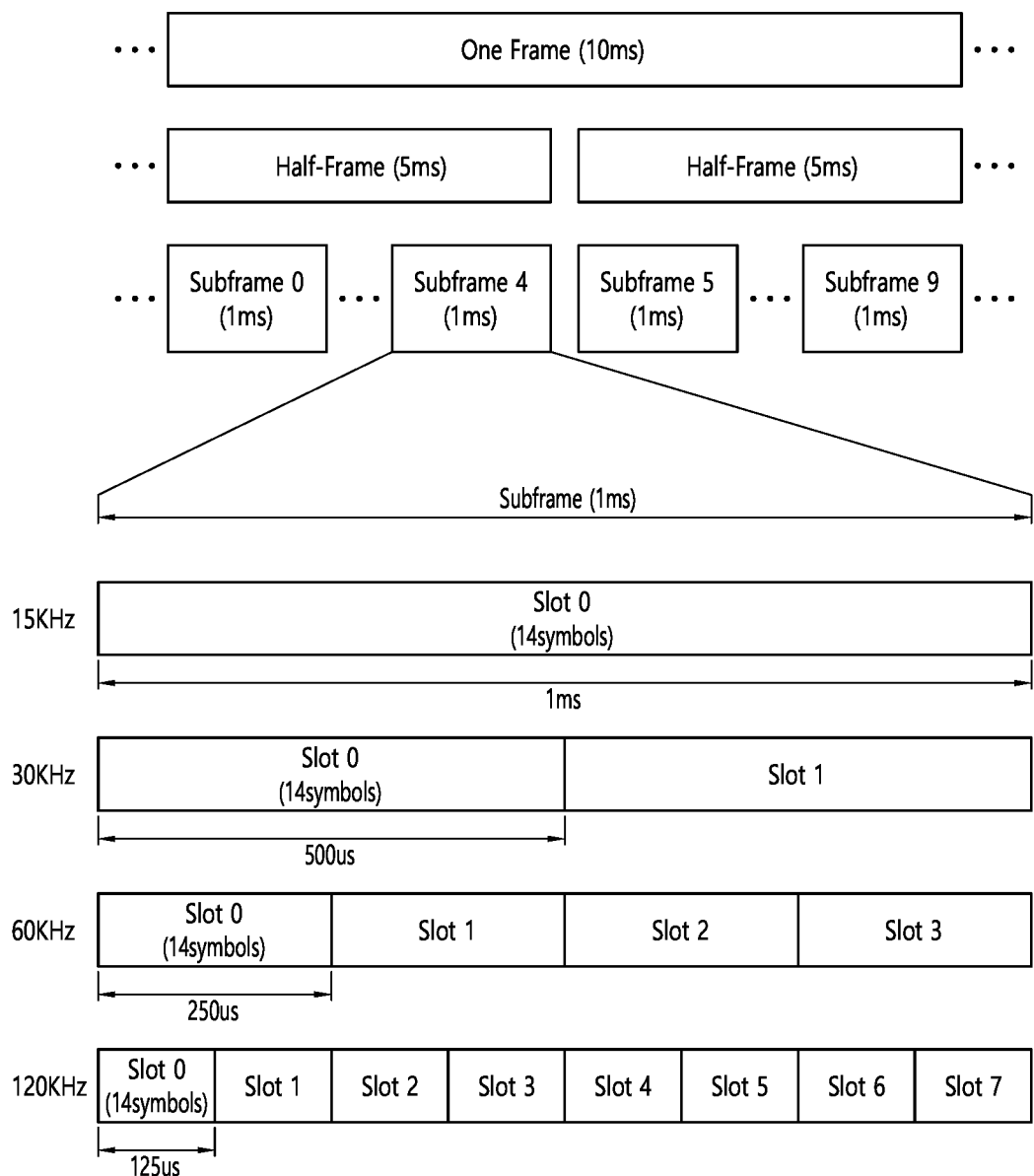
FIG. 4 shows a structure of a radio frame of an NR, in accordance with an embodiment of the present disclosure.

FIG. 4 shows a structure of a radio frame of an NR, in accordance with an embodiment of the present disclosure. The embodiment of FIG. 4 may be combined with various embodiments of the present disclosure.

Referring to FIG. 4, in the NR, a radio frame may be used for performing uplink and downlink transmission. A radio frame has a length of 10 ms and may be defined to be configured of two half-frames (HFs). A half-frame may include five 1 ms subframes (SFs). A subframe (SF) may be divided into one or more slots, and the number of slots within a subframe may be determined in accordance with subcarrier spacing (SCS). Each slot may include 12 or 14 OFDM(A) symbols according to a cyclic prefix (CP).

In case of using a normal CP, each slot may include 14 symbols. In case of using an extended CP, each slot may include 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

Table 1 shown below represents an example of a number of symbols per slot ($N^{slot}_{symb}$), a number slots per frame ($N^{frame,u}_{slot}$), and a number of slots per subframe ($N^{subframe,u}_{slot}$) in accordance with an SCS configuration (u), in a case where a normal CP is used.

TABLE 1

| SCS ($15*2^u$) | $N^{slot}_{symb}$ | $N^{frame,u}_{slot}$ | $N^{subframe,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 shows an example of a number of symbols per slot, a number of slots per frame, and a number of slots per subframe in accordance with the SCS, in a case where an extended CP is used.

TABLE 2

| SCS ($15*2^u$) | $N^{slot}_{symb}$ | $N^{frame,u}_{slot}$ | $N^{subframe,u}_{slot}$ |
|---|---|---|---|
| 60 KHz (u = 2) | 12 | 40 | 4 |

In an NR system, OFDM(A) numerologies (e.g., SCS, CP length, and so on) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells.

In the NR, multiple numerologies or SCSs for supporting diverse 5G services may be supported. For example, in case an SCS is 15 kHz, a wide area of the conventional cellular bands may be supported, and, in case an SCS is 30 kHz/60 kHz a dense-urban, lower latency, wider carrier bandwidth may be supported. In case the SCS is 60 kHz or higher, a bandwidth that is greater than 24.25 GHz may be used in order to overcome phase noise.

An NR frequency band may be defined as two different types of frequency ranges. The two different types of frequency ranges may be FR1 and FR2. The values of the frequency ranges may be changed (or varied), and, for example, the two different types of frequency ranges may be as shown below in Table 3. Among the frequency ranges that are used in an NR system, FR1 may mean a "sub 6 GHz range", and FR2 may mean an "above 6 GHz range" and may also be referred to as a millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As described above, the values of the frequency ranges in the NR system may be changed (or varied). For example, as shown below in Table 4, FR1 may include a band within a range of 410 MHz to 7125 MHz. More specifically, FR1 may include a frequency band of 6 GHz (or 5850, 5900, 5925 MHz, and so on) and higher. For example, a frequency band of 6 GHz (or 5850, 5900, 5925 MHz, and so on) and higher being included in FR1 mat include an unlicensed band. The unlicensed band may be used for diverse purposes, e.g., the unlicensed band for vehicle-specific communication (e.g., automated driving).

TABLE 4

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz-52600 MHz | 60, 120, 240 kHz |

Figure 5:
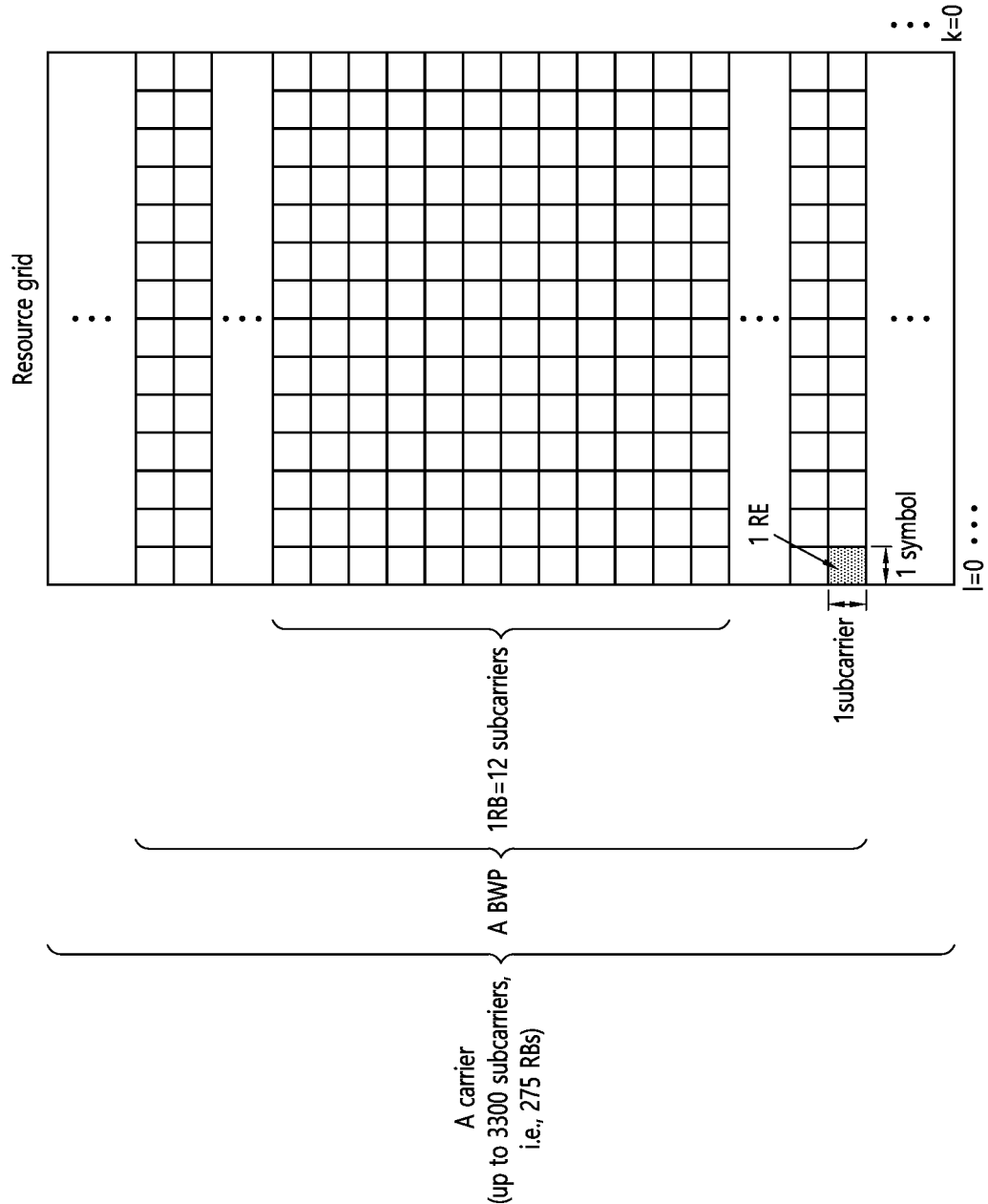
FIG. 5 shows a structure of a slot of an NR frame, in accordance with an embodiment of the present disclosure.

FIG. 5 shows a structure of a slot of an NR frame, in accordance with an embodiment of the present disclosure. The embodiment of FIG. 5 may be combined with various embodiments of the present disclosure.

Referring to FIG. 5, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain. A Resource Block (RB) may be defined as a plurality of consecutive subcarriers (e.g., 12 subcarriers) in the frequency domain. A Bandwidth Part (BWP) may be defined as a plurality of consecutive (Physical) Resource Blocks ((P)RBs) in the frequency domain, and the BWP may correspond to one numerology (e.g., SCS, CP length, and so on). A carrier may include a maximum of N number BWPs (e.g., 5 BWPs). Data communication may be performed via an activated BWP. Each element may be referred to as a Resource Element (RE) within a resource grid and one complex symbol may be mapped to each element.

Hereinafter, a bandwidth part (BWP) and a carrier will be described.

The BWP may be a set of consecutive physical resource blocks (PRBs) in a given numerology. The PRB may be selected from consecutive sub-sets of common resource blocks (CRBs) for the given numerology on a given carrier.

For example, the BWP may be at least any one of an active BWP, an initial BWP, and/or a default BWP. For example, the UE may not monitor downlink radio link quality in a DL BWP other than an active DL BWP on a primary cell (PCell). For example, the UE may not receive PDCCH, physical downlink shared channel (PDSCH), or channel state information-reference signal (CSI-RS) (excluding RRM) outside the active DL BWP. For example, the UE may not trigger a channel state information (CSI) report for the inactive DL BWP. For example, the UE may not transmit physical uplink control channel (PUCCH) or physical uplink shared channel (PUSCH) outside an active UL BWP. For example, in a downlink case, the initial BWP may be given as a consecutive RB set for a remaining minimum system information (RMSI) control resource set (CORE-SET) (configured by physical broadcast channel (PBCH)). For example, in an uplink case, the initial BWP may be given by system information block (SIB) for a random access procedure. For example, the default BWP may be configured by a higher layer. For example, an initial value of the default BWP may be an initial DL BWP. For energy saving, if the UE fails to detect downlink control information (DCI) during a specific period, the UE may switch the active BWP of the UE to the default BWP.

Meanwhile, the BWP may be defined for SL. The same SL BWP may be used in transmission and reception. For example, a transmitting UE may transmit an SL channel or an SL signal on a specific BWP, and a receiving UE may receive the SL channel or the SL signal on the specific BWP. In a licensed carrier, the SL BWP may be defined separately from a Uu BWP, and the SL BWP may have configuration signaling separate from the Uu BWP. For example, the UE may receive a configuration for the SL BWP from the BS/network. For example, the UE may receive a configuration for the Uu BWP from the BS/network. The SL BWP may be (pre-)configured in a carrier with respect to an out-of-coverage NR V2X UE and an RRC_IDLE UE. For the UE in the RRC_CONNECTED mode, at least one SL BWP may be activated in the carrier.

Figure 6:
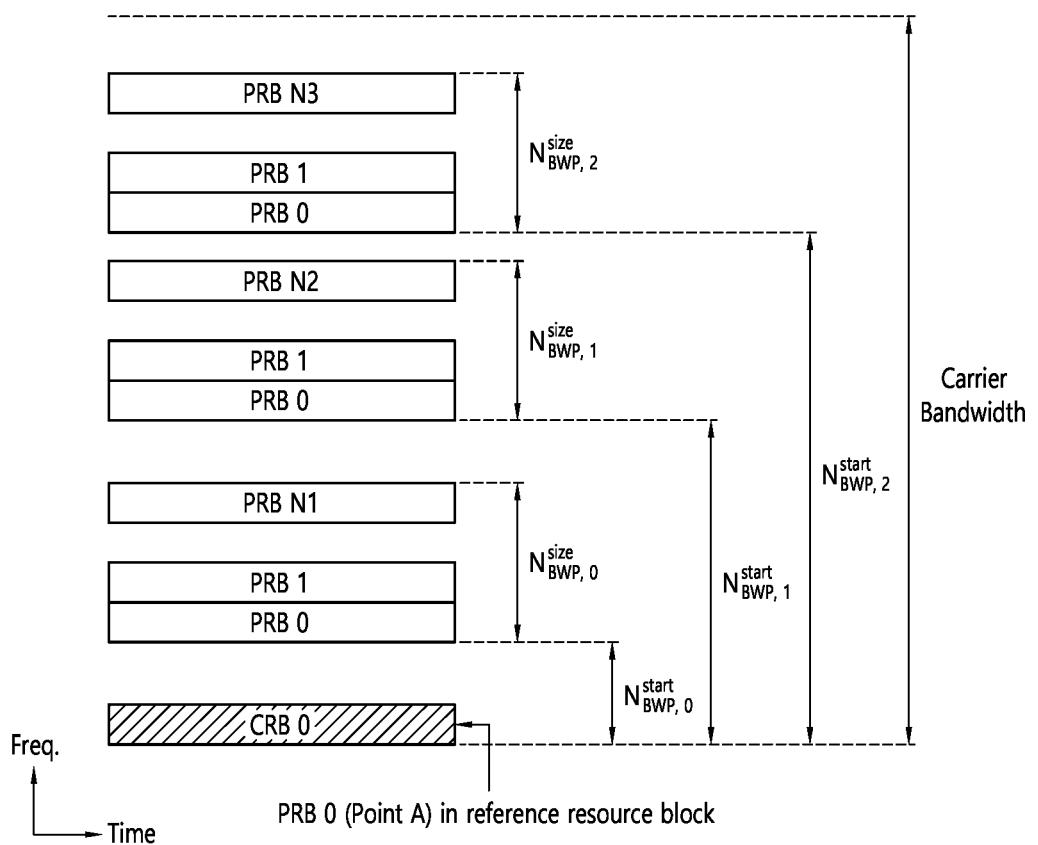
FIG. 6 shows an example of a BWP, in accordance with an embodiment of the present disclosure.

FIG. 6 shows an example of a BWP, in accordance with an embodiment of the present disclosure. The embodiment of FIG. 6 may be combined with various embodiments of the present disclosure. It is assumed in the embodiment of FIG. 6 that the number of BWPs is 3.

Referring to FIG. 6, a common resource block (CRB) may be a carrier resource block numbered from one end of a carrier band to the other end thereof. In addition, the PRB may be a resource block numbered within each BWP. A point A may indicate a common reference point for a resource block grid.

The BWP may be configured by a point A, an offset $N^{start}_{BWP}$ from the point A, and a bandwidth $N^{size}_{BWP}$. For example, the point A may be an external reference point of a PRB of a carrier in which a subcarrier 0 of all numerologies (e.g., all numerologies supported by a network on that carrier) is aligned. For example, the offset may be a PRB interval between a lowest subcarrier and the point A in a given numerology. For example, the bandwidth may be the number of PRBs in the given numerology.

Hereinafter, V2X or SL communication will be described.

A sidelink synchronization signal (SLSS) may include a primary sidelink synchronization signal (PSSS) and a secondary sidelink synchronization signal (SSSS), as an SL-specific sequence. The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, a UE may use the S-PSS for initial signal detection and for synchronization acquisition. For example, the UE may use the S-PSS and the S-SSS for acquisition of detailed synchronization and for detection of a synchronization signal ID.

A physical sidelink broadcast channel (PSBCH) may be a (broadcast) channel for transmitting default (system) information which must be first known by the UE before SL signal transmission/reception. For example, the default information may be information related to SLSS, a duplex mode (DM), a time division duplex (TDD) uplink/downlink (UL/DL) configuration, information related to a resource pool, a type of an application related to the SLSS, a subframe offset, broadcast information, or the like. For example, for evaluation of PSBCH performance, in NR V2X, a payload size of the PSBCH may be 56 bits including 24-bit cyclic redundancy check (CRC).

The S-PSS, the S-SSS, and the PSBCH may be included in a block format (e.g., SL synchronization signal (SS)/PSBCH block, hereinafter, sidelink-synchronization signal block (S-SSB)) supporting periodical transmission. The S-SSB may have the same numerology (i.e., SCS and CP length) as a physical sidelink control channel (PSCCH)/physical sidelink shared channel (PSSCH) in a carrier, and a transmission bandwidth may exist within a (pre-)configured sidelink (SL) BWP. For example, the S-SSB may have a bandwidth of 11 resource blocks (RBs). For example, the PSBCH may exist across 11 RBs. In addition, a frequency position of the S-SSB may be (pre-)configured. Accordingly, the UE does not have to perform hypothesis detection at frequency to discover the S-SSB in the carrier.

Figure 7:
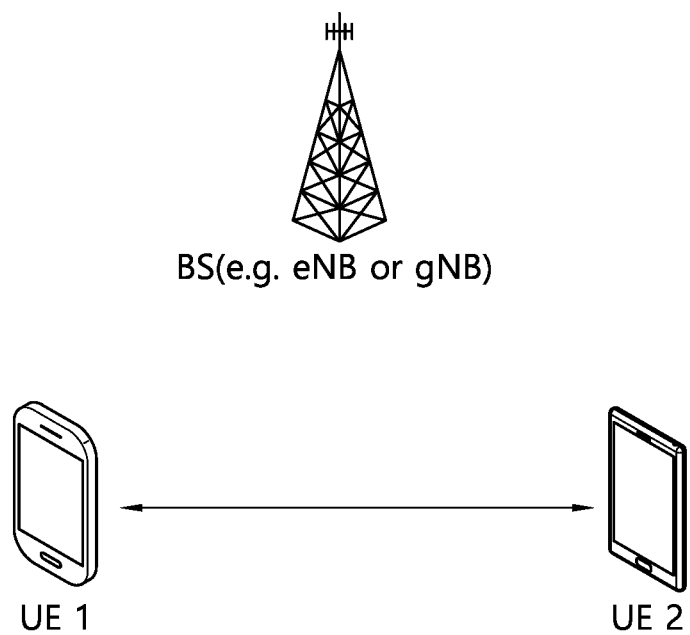
FIG. 7 shows a UE performing V2X or SL communication, in accordance with an embodiment of the present disclosure.

FIG. 7 shows a UE performing V2X or SL communication, in accordance with an embodiment of the present disclosure. The embodiment of FIG. 7 may be combined with various embodiments of the present disclosure.

Referring to FIG. 7, in V2X or SL communication, the term 'UE' may generally imply a UE of a user. However, if a network equipment such as a BS transmits/receives a signal according to a communication scheme between UEs, the BS may also be regarded as a sort of the UE. For example, a UE 1 may be a first apparatus 100, and a UE 2 may be a second apparatus 200.

For example, the UE 1 may select a resource unit corresponding to a specific resource in a resource pool which implies a set of series of resources. In addition, the UE 1 may transmit an SL signal by using the resource unit. For example, a resource pool in which the UE 1 is capable of transmitting a signal may be configured to the UE 2 which is a receiving UE, and the signal of the UE 1 may be detected in the resource pool.

Herein, if the UE 1 is within a connectivity range of the BS, the BS may inform the UE 1 of the resource pool. Otherwise, if the UE 1 is out of the connectivity range of the BS, another UE may inform the UE 1 of the resource pool, or the UE 1 may use a pre-configured resource pool.

In general, the resource pool may be configured in unit of a plurality of resources, and each UE may select a unit of one or a plurality of resources to use it in SL signal transmission thereof.

Hereinafter, resource allocation in SL will be described.

Figure 8:
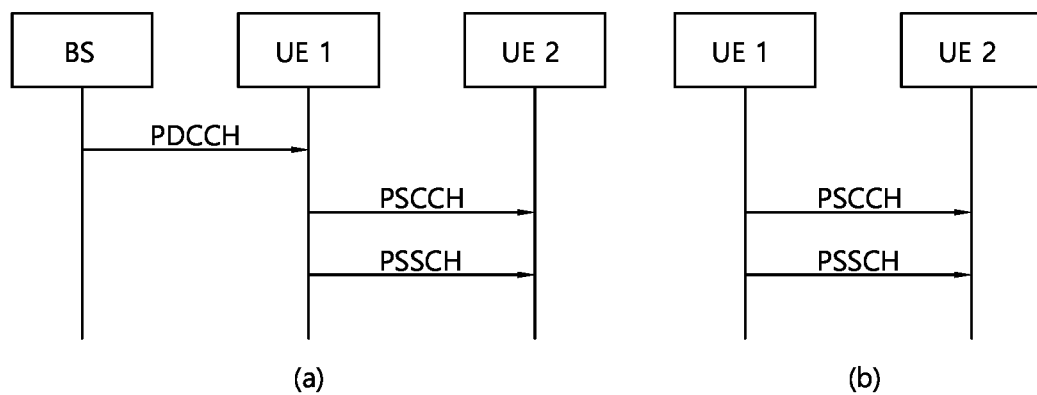
FIG. 8 shows a procedure of performing V2X or SL communication by a UE based on a transmission mode, in accordance with an embodiment of the present disclosure.

FIG. 8 shows a procedure of performing V2X or SL communication by a UE based on a transmission mode, in accordance with an embodiment of the present disclosure. The embodiment of FIG. 8 may be combined with various embodiments of the present disclosure. In various embodiments of the present disclosure, the transmission mode may be called a mode or a resource allocation mode. Hereinafter, for convenience of explanation, in LTE, the transmission mode may be called an LTE transmission mode. In NR, the transmission mode may be called an NR resource allocation mode.

For example, (a) of FIG. 8 shows a UE operation related to an LTE transmission mode 1 or an LTE transmission mode 3. Alternatively, for example, (a) of FIG. 8 shows a UE operation related to an NR resource allocation mode 1. For example, the LTE transmission mode 1 may be applied to general SL communication, and the LTE transmission mode 3 may be applied to V2X communication.

For example, (b) of FIG. 8 shows a UE operation related to an LTE transmission mode 2 or an LTE transmission mode 4. Alternatively, for example, (b) of FIG. 8 shows a UE operation related to an NR resource allocation mode 2.

Referring to (a) of FIG. 8, in the LTE transmission mode 1, the LTE transmission mode 3, or the NR resource allocation mode 1, a BS may schedule an SL resource to be used by the UE for SL transmission. For example, the BS may perform resource scheduling to a UE 1 through a PDCCH (e.g., downlink control information (DCI)) or RRC signaling (e.g., Configured Grant Type 1 or Configured Grant Type 2), and the UE 1 may perform V2X or SL communication with respect to a UE 2 according to the resource scheduling. For example, the UE 1 may transmit a sidelink control information (SCI) to the UE 2 through a physical sidelink control channel (PSCCH), and thereafter transmit data based on the SCI to the UE 2 through a physical sidelink shared channel (PSSCH).

Referring to (b) of FIG. 8, in the LTE transmission mode 2, the LTE transmission mode 4, or the NR resource allocation mode 2, the UE may determine an SL transmission resource within an SL resource configured by a BS/network or a pre-configured SL resource. For example, the configured SL resource or the pre-configured SL resource may be a resource pool. For example, the UE may autonomously select or schedule a resource for SL transmission. For example, the UE may perform SL communication by autonomously selecting a resource within a configured resource pool. For example, the UE may autonomously select a resource within a selective window by performing a sensing and resource (re)selection procedure. For example, the sensing may be performed in unit of subchannels. In addition, the UE 1 which has autonomously selected the resource within the resource pool may transmit the SCI to the UE 2 through a PSCCH, and thereafter may transmit data based on the SCI to the UE 2 through a PSSCH.

Figure 9:
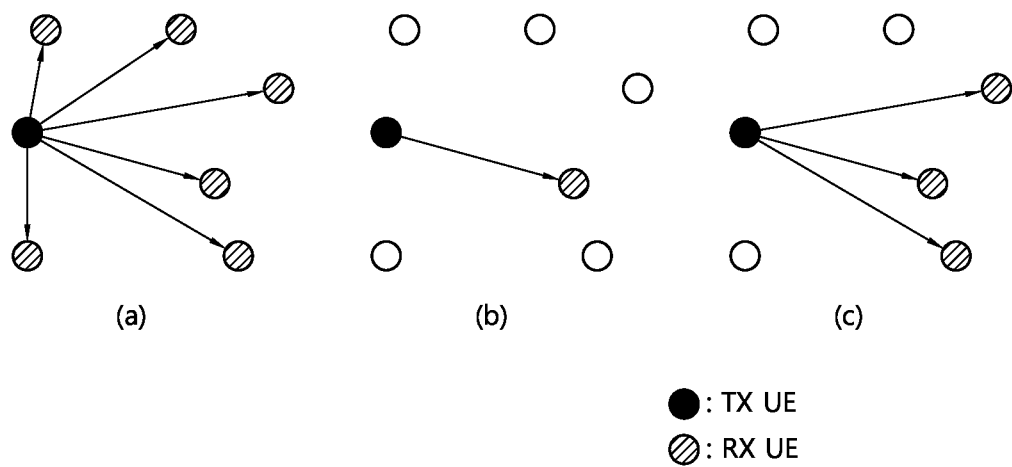
FIG. 9 shows three cast types, in accordance with an embodiment of the present disclosure.

FIG. 9 shows three cast types, in accordance with an embodiment of the present disclosure. The embodiment of FIG. 9 may be combined with various embodiments of the present disclosure. Specifically, FIG. 9(*a*) shows broadcast-type SL communication, FIG. 9(*b*) shows unicast type-SL communication, and FIG. 9(*c*) shows groupcast-type SL communication. In case of the unicast-type SL communication, a UE may perform one-to-one communication with respect to another UE. In case of the groupcast-type SL transmission, the UE may perform SL communication with respect to one or more UEs in a group to which the UE belongs. In various embodiments of the present disclosure, SL groupcast communication may be replaced with SL multicast communication, SL one-to-many communication, or the like.

On the other hand, in NR V2X communication or NR sidelink communication, a transmitting UE may reserve/select one or more transmission resources for sidelink transmission (e.g., initial transmission and/or retransmission), a transmitting UE may inform the receiving UE of information on the location of the one or more transmission resources.

Meanwhile, when performing sidelink communication, a method for a transmitting UE to reserve or pre-determine transmission resource(s) for receiving UE(s) may be representatively as follows.

For example, the transmitting UE may perform a reservation of transmission resource(s) based on a chain. Specifically, for example, if the transmitting UE reserves K transmission resources, the transmitting UE may transmit location information for less than K transmission resources to receiving UE(s) through a SCI transmitted to the receiving UE(s) at any (or specific) transmission time or a time resource. That is, for example, the SCI may include location information for less than the K transmission resources. Alternatively, for example, if the transmitting UE reserves K transmission resources related to a specific TB, the transmitting UE may transmit location information for less than K transmission resources to receiving UE(s) through a SCI transmitted to the receiving UE(s) at any (or specific) transmission time or a time resource. That is, the SCI may include location information for less than the K transmission resources. In this case, for example, it is possible to prevent performance degradation due to an excessive increase in payloads of the SCI, by signaling only the location information for less than K transmission resources to the receiving UE(s) through one SCI transmitted at any (or specific) transmission time or the time resource by the transmitting UE.

On the other hand, in resource allocation mode 2 of long-term evolution (LTE)/new radio (NR) V2X, by reserving N resources for initial transmission and retransmission of sidelink data, a transmitting UE performs initial transmission and retransmission of sidelink data. And, in resource allocation mode 2 of LTE/NR V2X, if a transmitting UE continues to receive sidelink (HARQ) NACKs for sidelink data transmitted to a receiving UE, the transmitting UE continuously delivers sidelink data to the receiving UE using N reserved resources. However, some of N reserved sidelink mode 2 resources may not be available due to a specific circumstance (for example, when uplink data and sidelink data to be transmitted exist at the same time, a situation in which sidelink data transmission is not performed because the transmission priority of uplink data is high by prioritization between uplink data and sidelink data) of a transmitting UE.

For example, when uplink data and sidelink data to be transmitted occur at the same time, a UE may transmit only one type of data among the two types of data. Accordingly, priorities of uplink data and sidelink data are compared and data having a higher priority is transmitted. When sidelink data cannot be transmitted continuously since uplink data has a high priority in prioritization, a transmitting UE may not be able to use all N sidelink mode 2 resources. That is, sidelink mode 2 resources may not be used as many times as the number of transmission failures due to lower priority than uplink data. {i.e., "(the number of sidelink mode 2 reservation resources, N)"–"(the number of sidelink mode 2 reservation resource being not used, M)"}.

As described above, in resource allocation mode 2 according to some embodiments, a method for compensating for a case where a transmitting UE does not use reserved sidelink mode 2 resources is not provided. That is, a transmitting UE transmits sidelink data only "N-M" times for sidelink data in the above example (sidelink data transmission is not performed M times).

In some embodiments of the present disclosure, a method for compensating for this when a transmitting UE does not use reserved sidelink mode 2 resources in resource allocation mode 2 is provided.

Figure 10:
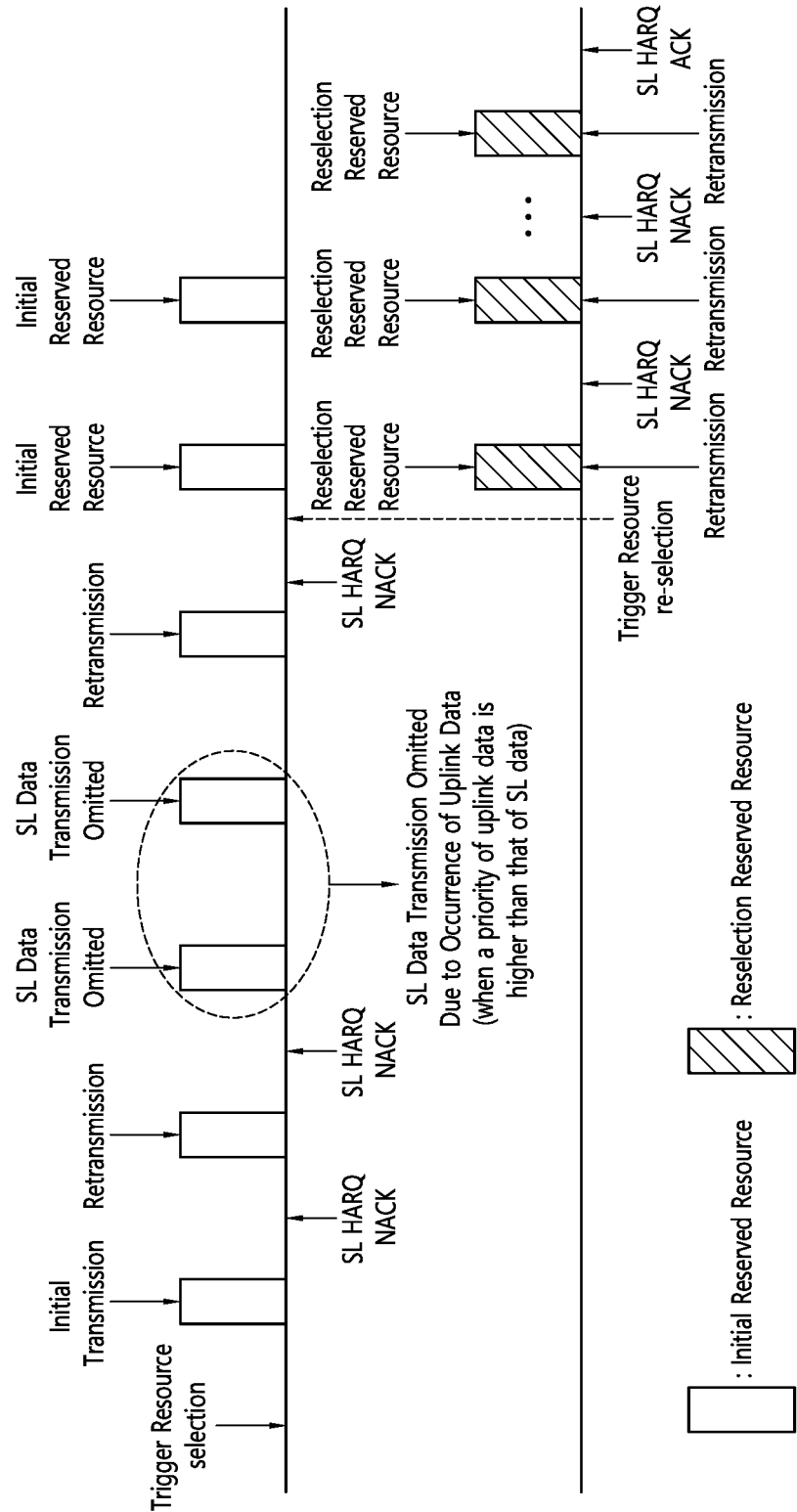
FIG. 10 is a diagram for explaining a method of reselecting a sidelink transmission resource according to an embodiment of the present disclosure.

FIG. 10 is a diagram for explaining a method of reselecting a sidelink transmission resource according to an embodiment of the present disclosure.

In one embodiment, when a transmitting UE operating in resource allocation mode 2 determined that a transmission of sidelink data could not be successfully completed because all resources reserved for sidelink data to be transmitted could not be used due to an exceptional situation (for example, a case where a transmission of sidelink data is not performed due to prioritization between uplink data and sidelink data), the transmitting UE may reselect transmission resources by newly triggering a resource re-selection procedure, and perform a procedure of retransmitting sidelink data using the reserved resources. FIG. 10 shows an example for explaining this embodiment.

As shown in FIG. 10, a transmitting UE operating in resource allocation mode 2 may reserve N resources (e.g., 7 as shown in FIG. 10) for transmitting sidelink data by triggering a resource selection procedure. The transmitting UE may not be able to use the mode 2 resource reserved M times (2 times in the example of FIG. 10) due to occurrence of an exception situation (for example, when uplink data and sidelink data to be transmitted exist at the same time, a situation in which sidelink data transmission is not performed because the transmission priority of uplink data is high by prioritization between uplink data and sidelink data).

While a transmitting UE is trying to perform retransmission using the 6th resource, for example, as shown in FIG. 10 (due to continued reception of sidelink (HARQ) NACK), if it is predicted in advance that sidelink (HARQ) NACK will occur even if all reserved resources are used up to the 7th (i.e., up to the Nth if generalized), a UE may re-reserve ae resource allocation mode 2 transmission resource by triggering a resource reselection procedure at the point immediately before using the 6th reserved resource. That is, since the transmitting UE has not used resource allocation mode 2 resources as many as M times (2 times in the example of FIG. 10) during the transmission, a resource reselection procedure can be triggered for compensation.

In another example, if a receiving UE fails to decode sidelink data even after the transmitting UE transmits the sidelink data based on all N reserved resources, the transmitting UE may re-reserve resource allocation mode 2 transmission resources by triggering a resource reselection procedure.

A transmitting UE may continue sidelink retransmission using resources additionally reserved by the resource reselection procedure. In addition, a UE may cancel the remaining resources reserved by the initial resource selection procedure.

Figure 11:
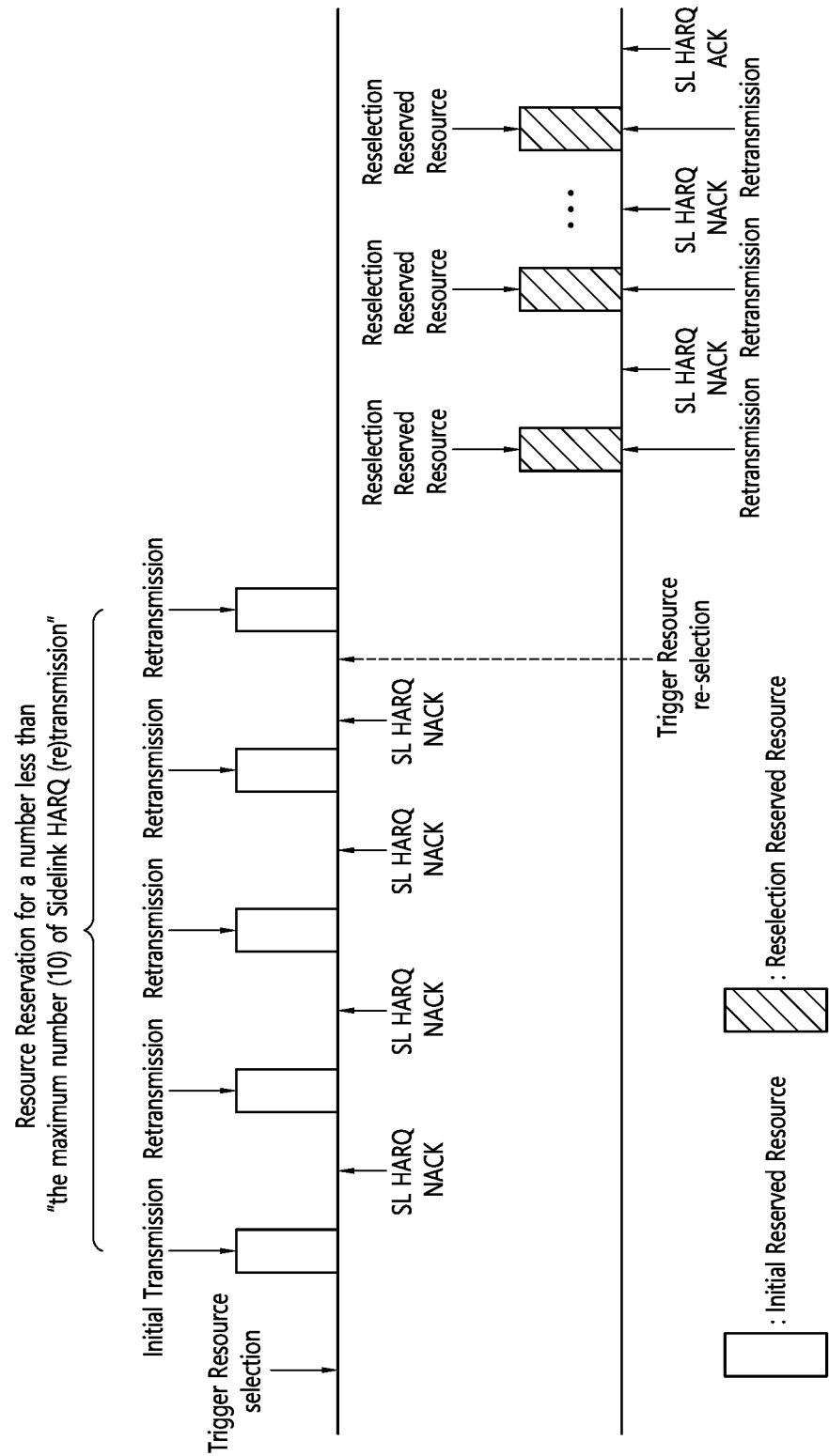
FIG. 11 is a diagram for explaining a method of reselecting sidelink transmission resources according to another embodiment of the present disclosure.

FIG. 11 is a diagram for explaining a method of reselecting sidelink transmission resources according to another embodiment of the present disclosure.

In one embodiment, a method for designating the maximum number of (re)transmissions of resource allocation mode 2 according to Quality of Service (QoS) (e.g., sidelink priority or priority of sidelink logical channel) of an individual sidelink transport block (TB) is proposed.

A base station may configure radio configuration parameters that can be used for sidelink communication in a transmitting UE and transmit them to a transmitting UE through an RRC message. At this time, a base station may configure "the maximum number of sidelink HARQ (re) transmissions" used in resource allocation mode 2 according to QoS (e.g., sidelink priority or priority of sidelink logical channel) and transmit it to a transmitting UE. That is, a transmitting UE operating based on resource allocation mode 2 may perform resource allocation mode 2 operation by applying different "maximum number of Sidelink HARQ (re)transmissions" according to the QoS (e.g., sidelink priority or priority of sidelink logical channel) of individual TBs.

In one embodiment, a UE may perform resource selection based on resource allocation mode 2 based on "the maximum number of sidelink HARQ (re)transmissions" configured through a base station. A transmitting UE can reserve resources equal to or less than "the maximum number of Sidelink HARQ (re)transmissions".

In case reserved resources are insufficient due to continuous reception of SL (HARQ) NACK from a receiving UE while performing sidelink data transmission by reserving resources less than "the maximum number of Sidelink HARQ (re)transmissions", by triggering a resource reselection procedure, resource allocation mode 2 resources may be additionally reserved. Additional resources that are additionally reserved through the resource reselection procedure can be limited so that they cannot exceed "the maximum number of Sidelink HARQ (re)transmissions" when including the number of previously reserved resources. Alternatively, resources additionally reserved through the resource reselection procedure may be reserved within a range that does not exceed a Packet Delay Budget (PDB) of sidelink data being transmitted.

FIG. 11 is an example for explaining some of the above-described embodiments.

As shown in FIG. 11, it is assumed that a transmitting UE operating in resource allocation mode 2 reserves 5 resource allocation mode 2 resources less than "the maximum number of Sidelink HARQ (re)transmissions (e.g., 10)" configured by a base station in a resource selection procedure. After transmitting sidelink data to the counterpart receiving UE, and receiving SL (HARQ) NACK continuously and before using the 5th last retransmission resource or after using the 5th last retransmission resource, a transmitting UE may reserve three additional retransmission resources by triggering a resource reselection procedure. A transmitting UE may continue sidelink retransmission using additionally reserved (three) resources through the resource reselection procedure.

According to various embodiments of the present disclosure, when sidelink transmission cannot be successfully completed due to insufficient resources reserved in resource allocation mode 2, sidelink transmission can be continued by allowing a transmitting UE to reselect a new resource.

Figure 12:
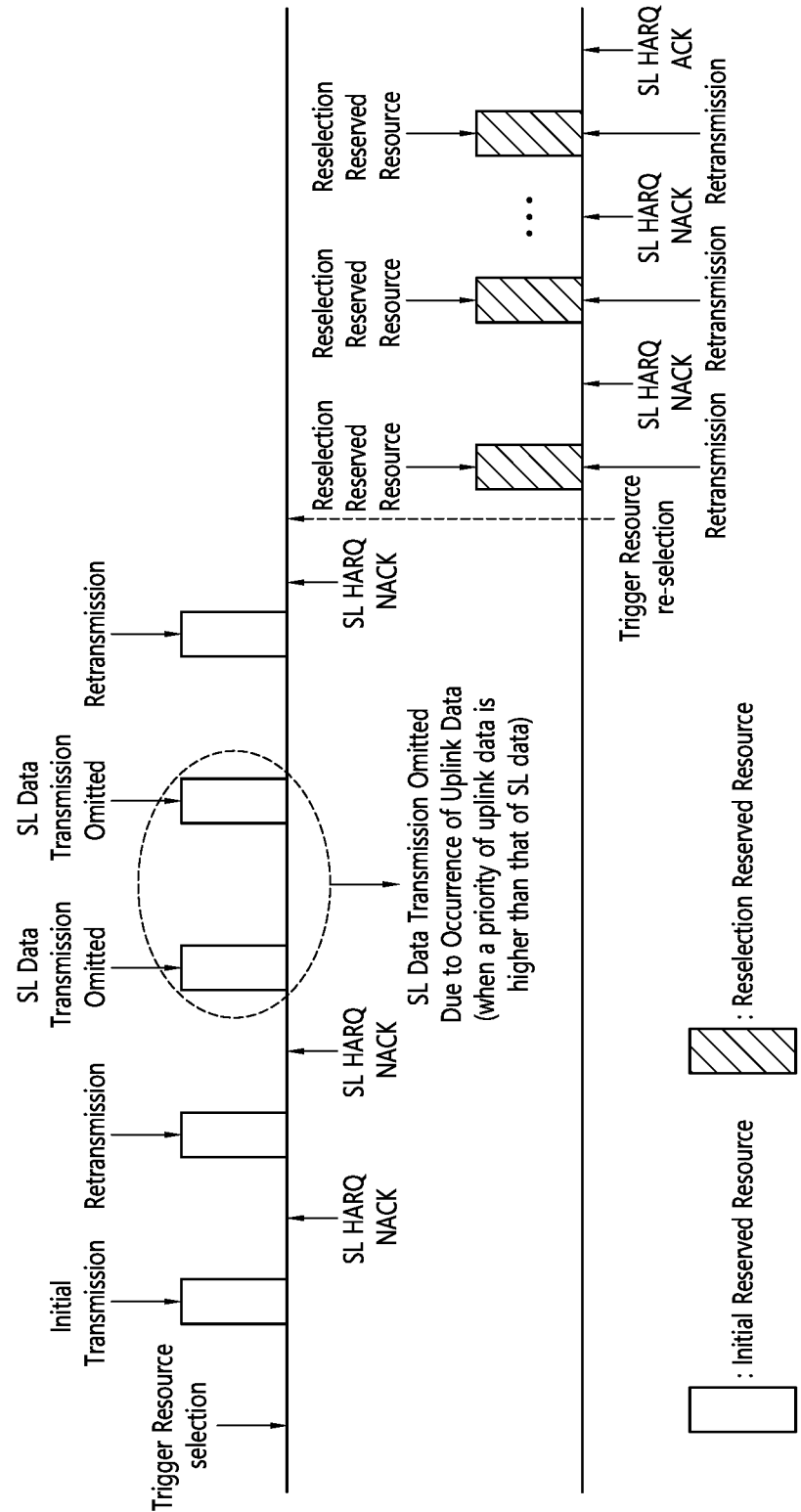
FIG. 12 is a diagram for explaining a method of reselecting a sidelink transmission resource according to another embodiment of the present disclosure.

FIG. 12 is a diagram for explaining a method of reselecting a sidelink transmission resource according to another embodiment of the present disclosure.

As described above in FIG. 10, in one embodiment, when it is determined that a transmission UE operating in resource allocation mode 2 cannot successfully complete transmission of sidelink data because all resources reserved for sidelink data to be transmitted cannot be used due to an exceptional situation (for example, a situation in which a transmission of sidelink data is not performed due to prioritization between uplink data and sidelink data), the transmitting UE may newly trigger a resource re-selection procedure to reserve transmission resources again and perform a procedure of retransmitting sidelink data using the reserved resources.

As shown in FIG. 12, a transmitting UE operating in resource allocation mode 2 may reserve N resources for transmitting sidelink data by triggering a resource selection procedure. A transmitting UE may not be able to use mode 2 resources reserved M times (2 in the example of FIG. 10) due to occurrence of an exceptional situation (for example, when uplink data and sidelink data to be transmitted exist at the same time, a situation in which sidelink data transmission is not performed because the transmission priority of uplink data is high by prioritization between uplink data and sidelink data).

As shown in FIG. 12, when a receiving UE fails to decode sidelink data even after a transmitting UE transmits the sidelink data based on all N reserved resources (in addition, when a transmitting UE recognizes that a receiving UE has failed to decode the sidelink data), the transmitting UE may re-reserve a resource allocation mode 2 transmission resource by triggering resource reselection procedure.

Figure 13:
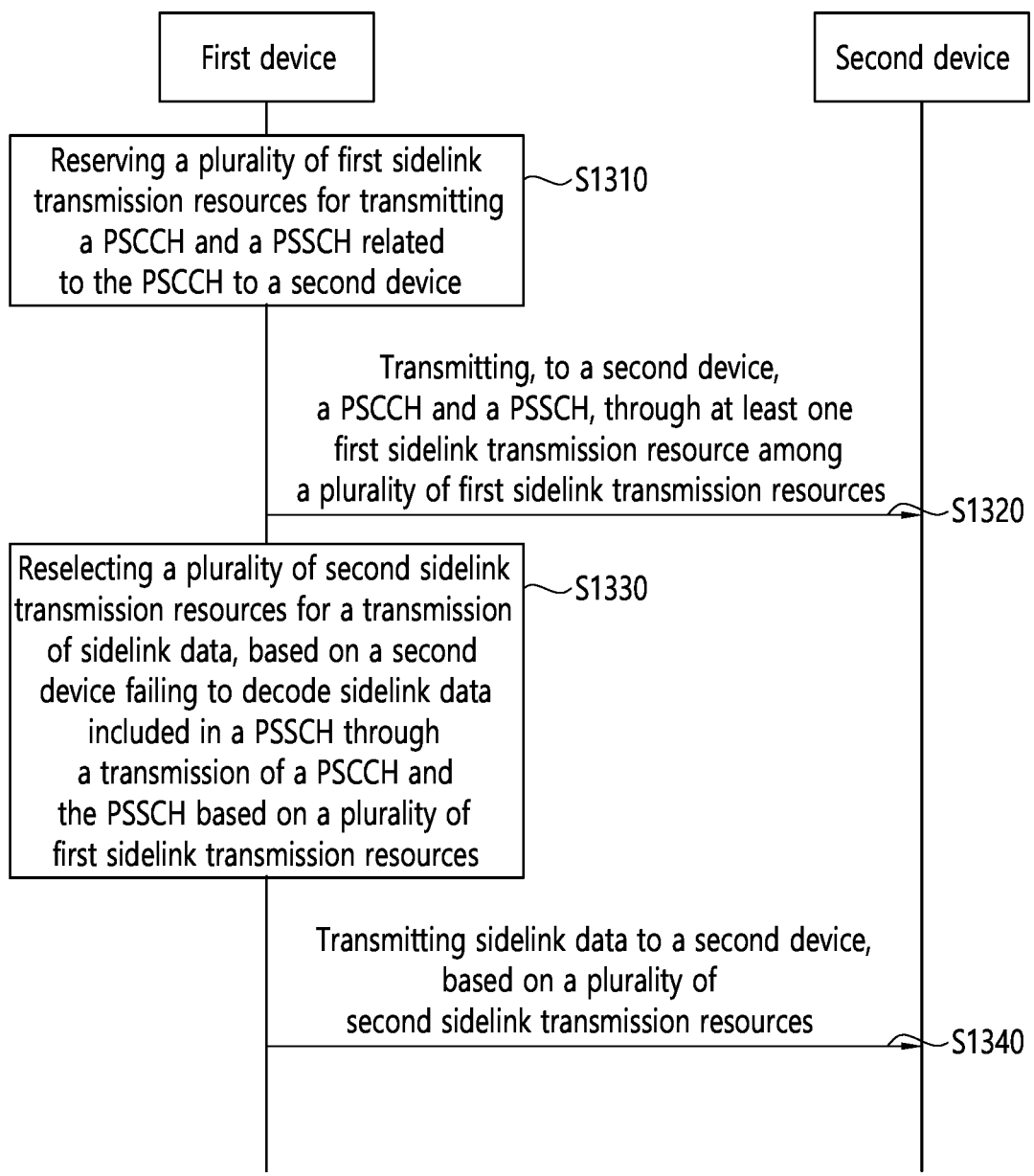
FIG. 13 shows a method in which a first device and a second device perform sidelink communication according to an embodiment of the present disclosure.

FIG. 13 shows a method in which a first device and a second device perform sidelink communication according to an embodiment of the present disclosure.

At least one of the following steps S1310 to S1340 may be directly or indirectly related to some of the foregoing embodiments/examples. On the other hand, at least one of the following steps S1310 to S1340 is only related to some of the above-described embodiments/examples, therefore, even if at least one of the following steps S1310 to S1340 is different from some of the foregoing embodiments/examples in content, the different content should not be construed as outside the scope of the present description.

In step S1310, a first device according to an embodiment may reserve a plurality of first sidelink transmission resources for transmitting a PSCCH and a PSSCH related to the PSCCH to a second device. In step S1320, a first device according to an embodiment may transmit a PSCCH and a PSSCH to a second device through at least one first sidelink transmission resource among a plurality of first sidelink transmission resources. In step S1330, a first device according to an embodiment may reselect a plurality of second sidelink transmission resources for transmission of sidelink data based on a second device failing to decode sidelink data included in a PSSCH through a transmission of a PSCCH and the PSSCH based on a plurality of first sidelink transmission resources. In step S1340, a first device according to an embodiment may transmit sidelink data to a second device based on a plurality of second sidelink transmission resources.

In one embodiment, based on the first priority related to the sidelink data being lower than a second priority related to uplink transmission to a base station, the PSCCH and the PSSCH may not be transmitted to the second device in the at least one second sidelink transmission resource among the plurality of first sidelink transmission resources.

In an embodiment, the plurality of first sidelink transmission resources and the plurality of second sidelink transmission resources may be for sidelink communication based on sidelink mode 2.

In one embodiment, resource pool information for transmitting the sidelink data to the second device and information regarding the first priority may be transmitted from a medium access control (MAC) layer to a physical (PHY) layer of the first device.

Figure 14:
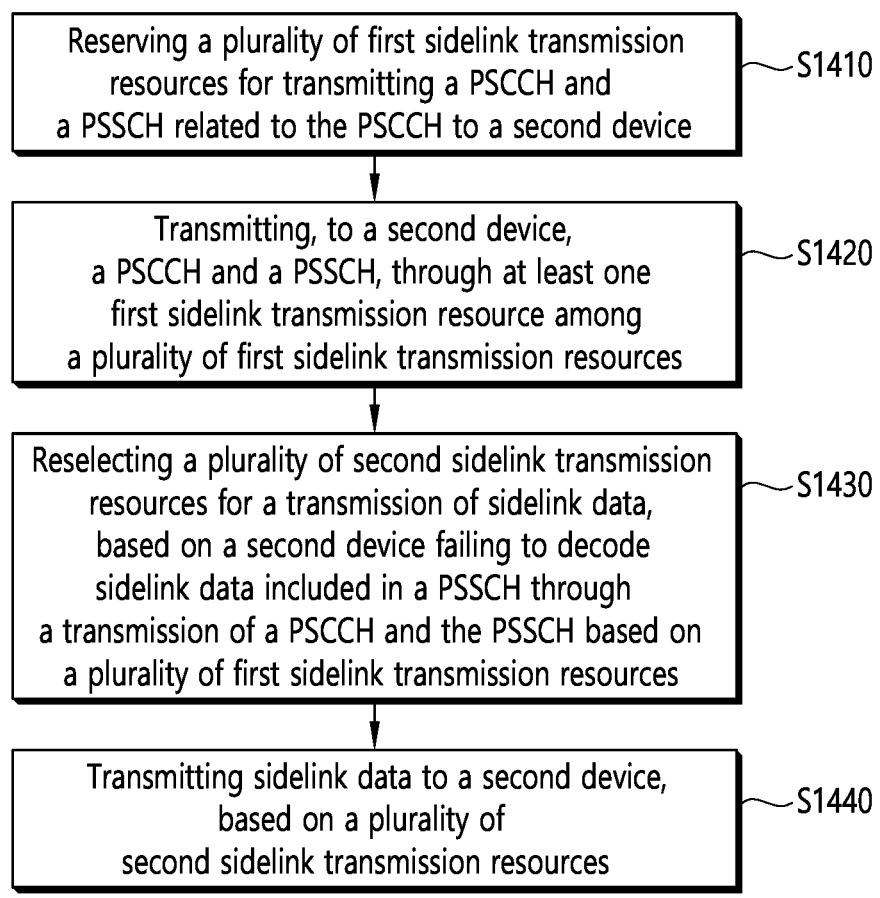
FIG. 14 is a flowchart showing a method in which a first device performs sidelink communication according to an embodiment of the present disclosure.

FIG. 14 is a flowchart showing a method in which a first device performs sidelink communication according to an embodiment of the present disclosure.

Operations disclosed in the flowchart of FIG. 14 may be performed in combination with various embodiments of the present disclosure. In one example, the operations disclosed in the flowchart of FIG. 14 may be performed based on at least one of devices shown in FIGS. 16 to 21. In one example, the first device of FIG. 14 may correspond to the first wireless device 100 of FIG. 17 described below, and the second device may correspond to the second wireless device 200 of FIG. 17. In another example, the first device of FIG. 14 may correspond to the second wireless device 200 of FIG. 17 described below, and the second device may correspond to the first wireless device 100.

In step S1410, a first device according to an embodiment may reserve a plurality of first sidelink transmission resources for transmitting a physical sidelink control channel (PSCCH) and a physical sidelink shared channel (PSSCH) related to the PSCCH to a second device.

In step S1420, the first device according to an embodiment may transmit the PSCCH and the PSSCH to the second device, through at least one first sidelink transmission resource among the plurality of first sidelink transmission resources.

In step S1430, the first device according to an embodiment may reselect a plurality of second sidelink transmission resources for a transmission of sidelink data, based on the second device failing to decode the sidelink data included in the PSSCH through the transmission of the PSCCH and the PSSCH based on the plurality of first sidelink transmission resources.

In step S1440, the first device according to an embodiment may transmit the sidelink data to the second device, based on the plurality of second sidelink transmission resources.

In one embodiment, the PSCCH and the PSSCH may be not transmitted to the second device on at least one second sidelink transmission resource among the plurality of first sidelink transmission resources, based on a first priority related to the sidelink data.

In one embodiment, the plurality of second sidelink transmission resources may be reselected, based on the PSCCH and the PSSCH being not transmitted to the second device on the at least one second sidelink transmission resource.

In one embodiment, the PSCCH and the PSSCH may be not transmitted to the second device on the at least one second sidelink transmission resource among the plurality of first sidelink transmission resources, based on the first priority related to the sidelink data being lower than a second priority related to an uplink transmission to a base station.

In one embodiment, the plurality of first sidelink transmission resources and the plurality of second sidelink transmission resources may be for sidelink communication based on sidelink mode 2.

In one embodiment, resource pool information and information regarding the first priority, for transmitting the sidelink data to the second device, may be transferred from a medium access control (MAC) layer to a physical (PHY) layer of the first device.

In one embodiment, a maximum number of sidelink hybrid automatic repeat request (HARQ) transmissions of a transport block may be configured based on quality of service (QoS) information of the transport block for transmitting the sidelink data to the second device.

In one embodiment, the maximum number of sidelink HARQ transmissions may be included in a radio resource control (RRC) message received from a base station.

In one embodiment, the QoS information may include priority information based on a sidelink logical channel (LCH) related to the transport block.

In one embodiment, sum of a number of the plurality of first sidelink transmission resources and a number of the plurality of second sidelink transmission resources may be lower than or equal to the maximum number of sidelink HARQ transmissions.

In one embodiment, the plurality of second sidelink transmission resources may be reselected within a range which does not exceed packet delay budget (PDB) for the sidelink data.

In one embodiment, triggering for the reselection of the plurality of second sidelink transmission resources may be performed before an end time point of the plurality of first sidelink transmission resources.

In another embodiment, triggering for the reselection of the plurality of second sidelink transmission resources may be performed after an end time point of the plurality of first sidelink transmission resources.

According to an embodiment of the present disclosure, a first device for performing wireless communication may be proposed. The first device may comprise: one or more memories storing instructions; one or more transceivers; and one or more processors connected to the one or more memories and the one or more transceivers, wherein the one or more processors execute the instructions to: reserve a plurality of first sidelink transmission resources for transmitting a physical sidelink control channel (PSCCH) and a physical sidelink shared channel (PSSCH) related to the PSCCH to a second device; transmit the PSCCH and the PSSCH to the second device, through at least one first sidelink transmission resource among the plurality of first sidelink transmission resources; reselect a plurality of second sidelink transmission resources for a transmission of sidelink data, based on the second device failing to decode the sidelink data included in the PSSCH through the transmission of the PSCCH and the PSSCH based on the plurality of first sidelink transmission resources; and transmit the sidelink data to the second device, based on the plurality of second sidelink transmission resources, wherein the PSCCH and the PSSCH may be not transmitted to the second device on at least one second sidelink transmission resource among the plurality of first sidelink transmission resources, based on a first priority related to the sidelink data, and wherein the plurality of second sidelink transmission resources may be reselected, based on the PSCCH and the PSSCH being not transmitted to the second device on the at least one second sidelink transmission resource.

According to an embodiment of the present disclosure, a device (or a chip(set)) adapted to control a first user equipment (UE) may be proposed. The device may comprise: one or more processors; and one or more memories operably connectable to the one or more processors and storing instructions, wherein the one or more processors execute the instructions to: reserve a plurality of first sidelink transmission resources for transmitting a physical sidelink control channel (PSCCH) and a physical sidelink shared channel (PSSCH) related to the PSCCH to a second UE; transmit the PSCCH and the PSSCH to the second UE, through at least one first sidelink transmission resource among the plurality of first sidelink transmission resources; reselect a plurality of second sidelink transmission resources for a transmission of sidelink data, based on the second UE failing to decode the sidelink data included in the PSSCH through the transmission of the PSCCH and the PSSCH based on the plurality of first sidelink transmission resources; and transmit the sidelink data to the second UE, based on the plurality of second sidelink transmission resources, wherein the PSCCH and the PSSCH may be not transmitted to the second UE on at least one second sidelink transmission resource among the plurality of first sidelink transmission resources, based on a first priority related to the sidelink data, and the plurality of second sidelink transmission resources may be reselected, based on the PSCCH and the PSSCH being not transmitted to the second UE on the at least one second sidelink transmission resource.

In one embodiment, the first UE in the above embodiment may represent the first device described throughout this disclosure. In one embodiment, the at least one processor, the at least one memory, etc. in the device for controlling the first UE may each be implemented as separate sub-chips, or at least two or more components maybe implemented through one sub-chip.

According to an embodiment of the present disclosure, a non-transitory computer-readable storage medium storing instructions (or indications) may be proposed. The instructions, when executed, may cause a first device to: reserve a plurality of first sidelink transmission resources for transmitting a physical sidelink control channel (PSCCH) and a physical sidelink shared channel (PSSCH) related to the PSCCH to a second device; transmit the PSCCH and the PSSCH to the second device, through at least one first sidelink transmission resource among the plurality of first sidelink transmission resources; reselect a plurality of second sidelink transmission resources for a transmission of sidelink data, based on the second device failing to decode the sidelink data included in the PSSCH through the transmission of the PSCCH and the PSSCH based on the plurality of first sidelink transmission resources; and transmit the sidelink data to the second device, based on the plurality of second sidelink transmission resources, wherein the PSCCH and the PSSCH may be not transmitted to the second device on at least one second sidelink transmission resource among the plurality of first sidelink transmission resources, based on a first priority related to the sidelink data, and wherein the plurality of second sidelink transmission resources may be reselected, based on the PSCCH and the PSSCH being not transmitted to the second device on the at least one second sidelink transmission resource.

Figure 15:
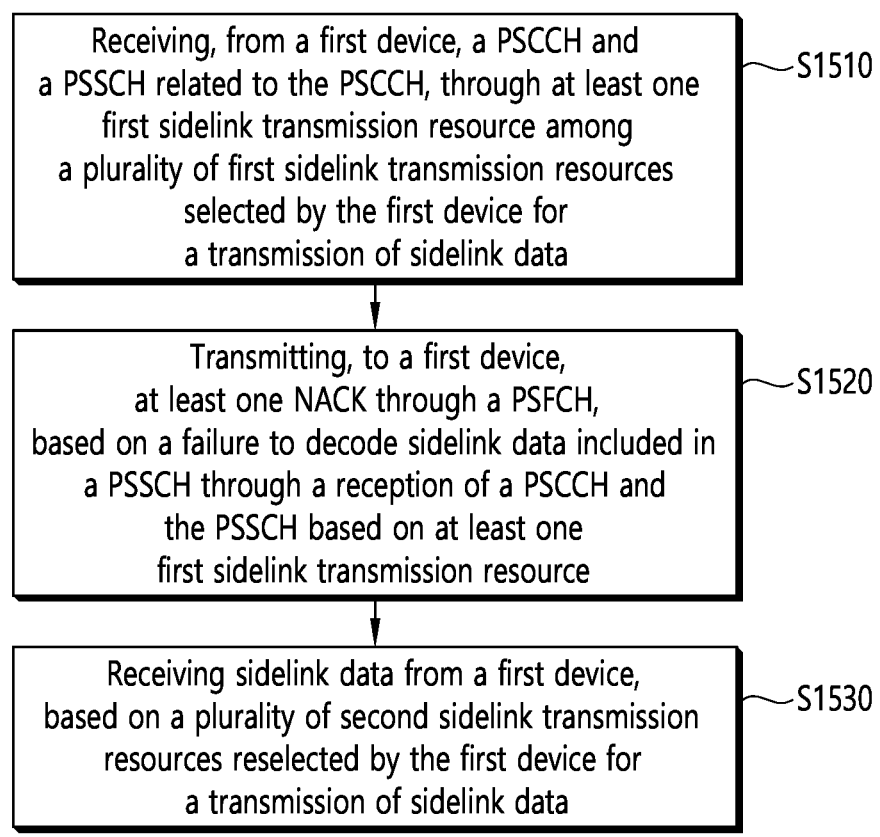
FIG. 15 is a flowchart showing a method for a second device to perform sidelink communication according to an embodiment of the present disclosure.

FIG. 15 is a flowchart showing a method for a second device to perform sidelink communication according to an embodiment of the present disclosure.

Operations disclosed in the flowchart of FIG. 15 may be performed in combination with various embodiments of the present disclosure. In one example, the operations disclosed in the flowchart of FIG. 15 may be performed based on at least one of the devices shown in FIGS. 16 to 21. In one example, the second device of FIG. 15 may correspond to the second wireless device 200 of FIG. 17 described below, and the first device may correspond to the first wireless device 100 of FIG. 17. In another example, the second device of FIG. 15 may correspond to the first wireless device 100 of FIG. 17 described below, and the first device may correspond to the second wireless device 200 of FIG. 17.

In step S1510, a second device according to an embodiment may receive a physical sidelink control channel (PSCCH) and a physical sidelink shared channel (PSSCH) related to the PSCCH from a first device, through at least one first sidelink transmission resource among a plurality of first sidelink transmission resources selected for a transmission of sidelink data by the first device.

In step S1520, the second device according to an embodiment may transmit at least one negative acknowledgement (NACK) to the first device through a physical sidelink feedback channel (PSFCH), based on a failure to decode the sidelink data included in the PSSCH through the reception of the PSCCH and the PSSCH based on the plurality of first sidelink transmission resources.

In step S1530, the second device according to an embodiment may receive the sidelink data from the first device, based on a plurality of second sidelink transmission resources reselected by the first device for the transmission of the sidelink data.

In one embodiment, the PSCCH and the PSSCH may be not transmitted to the second device from the first device on at least one second sidelink transmission resource among the plurality of first sidelink transmission resources, based on a first priority related to the sidelink data.

In one embodiment, the plurality of second sidelink transmission resources may be reselected by the first device, based on the PSCCH and the PSSCH being not transmitted to the second device from the first device on the at least one second sidelink transmission resource.

In one embodiment, the PSCCH and the PSSCH may be not transmitted to the second device from the first device on the at least one second sidelink transmission resource among the plurality of first sidelink transmission resources, based on the first priority related to the sidelink data being lower than a second priority related to an uplink transmission to a base station from the first device.

In one embodiment, the plurality of second sidelink transmission resources may be reselected, based on the PSCCH and the PSSCH being not transmitted to the second device on the at least one second sidelink transmission resource.

In one embodiment, the PSCCH and the PSSCH may be not transmitted to the second device on the at least one second sidelink transmission resource among the plurality of first sidelink transmission resources, based on the first priority related to the sidelink data being lower than a second priority related to an uplink transmission to a base station.

In one embodiment, the plurality of first sidelink transmission resources and the plurality of second sidelink transmission resources may be for sidelink communication based on sidelink mode 2.

In one embodiment, resource pool information and information regarding the first priority, for transmitting the sidelink data to the second device, may be transferred from a medium access control (MAC) layer to a physical (PHY) layer of the first device.

In one embodiment, a maximum number of sidelink hybrid automatic repeat request (HARQ) transmissions of a transport block may be configured based on quality of service (QoS) information of the transport block for transmitting the sidelink data to the second device.

In one embodiment, the maximum number of sidelink HARQ transmissions may be included in a radio resource control (RRC) message received from a base station.

In one embodiment, the QoS information may include priority information based on a sidelink logical channel (LCH) related to the transport block.

In one embodiment, sum of a number of the plurality of first sidelink transmission resources and a number of the plurality of second sidelink transmission resources may be lower than or equal to the maximum number of sidelink HARQ transmissions.

In one embodiment, the plurality of second sidelink transmission resources may be reselected within a range which does not exceed packet delay budget (PDB) for the sidelink data.

In one embodiment, triggering for the reselection of the plurality of second sidelink transmission resources may be performed before an end time point of the plurality of first sidelink transmission resources.

In another embodiment, triggering for the reselection of the plurality of second sidelink transmission resources may be performed after an end time point of the plurality of first sidelink transmission resources.

According to an embodiment of the present disclosure, a second device for performing wireless communication may be proposed. The second device may comprise: one or more memories storing instructions; one or more transceivers; and one or more processors connected to the one or more memories and the one or more transceivers, wherein the one or more processors execute the instructions to: receive a physical sidelink control channel (PSCCH) and a physical sidelink shared channel (PSSCH) related to the PSCCH from a first device, through at least one first sidelink transmission resource among a plurality of first sidelink transmission resources selected for a transmission of sidelink data by the first device; transmit at least one negative acknowledgement (NACK) to the first device through a physical sidelink feedback channel (PSFCH), based on a failure to decode the sidelink data included in the PSSCH through the reception of the PSCCH and the PSSCH based on the plurality of first sidelink transmission resources; and receive the sidelink data from the first device, based on a plurality of second sidelink transmission resources reselected by the first device for the transmission of the sidelink data, wherein the PSCCH and the PSSCH may be not transmitted to the second device from the first device on at least one second sidelink transmission resource among the plurality of first sidelink transmission resources, based on a first priority related to the sidelink data, and wherein the plurality of second sidelink transmission resources may be reselected by the first device, based on the PSCCH and the PSSCH being not transmitted to the second device from the first device on the at least one second sidelink transmission resource.

Various embodiments of the present disclosure may be combined with each other.

Hereinafter, device(s) to which various embodiments of the present disclosure can be applied will be described.

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 16:
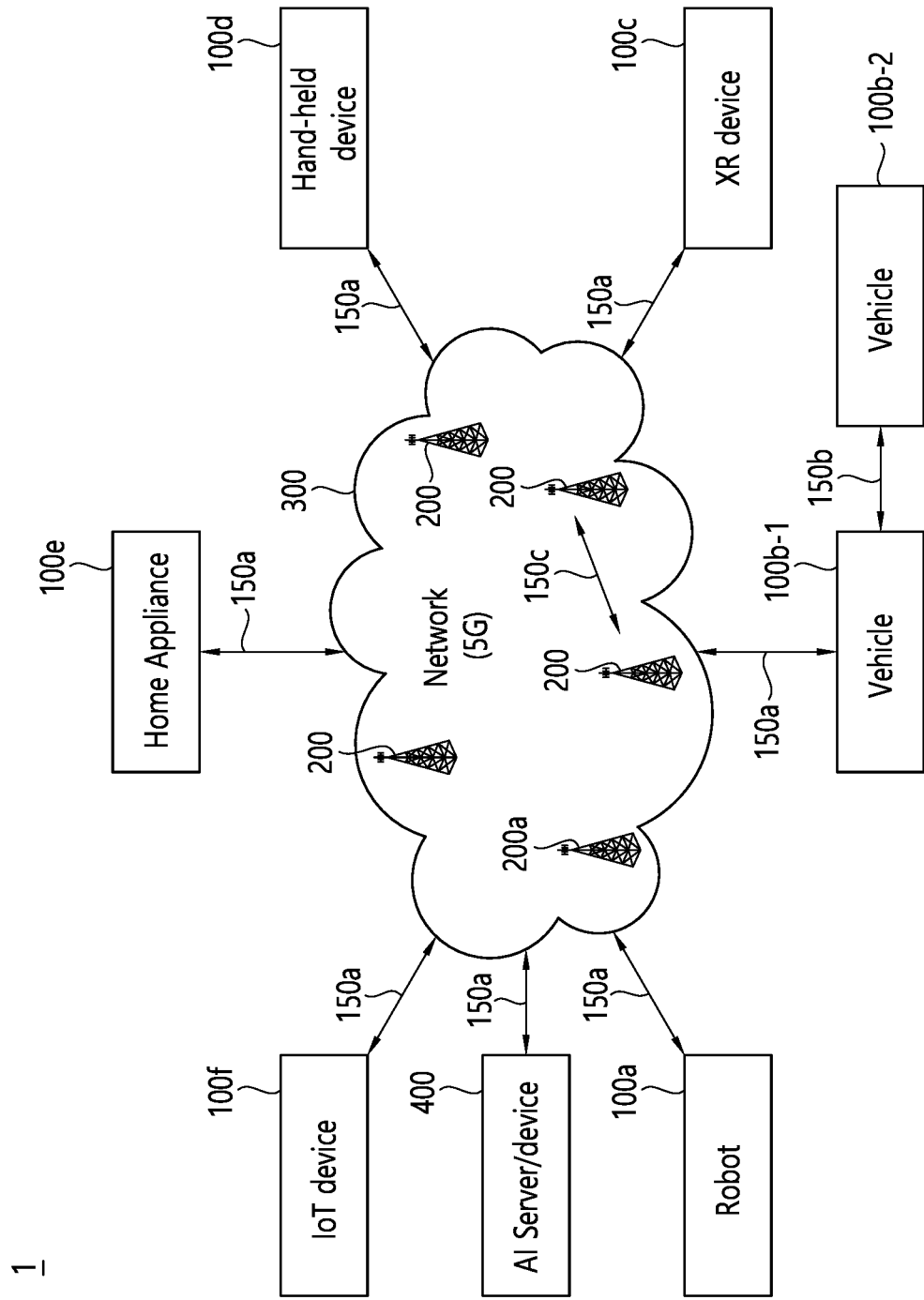
FIG. 16 shows a communication system 1, in accordance with an embodiment of the present disclosure.

FIG. 16 shows a communication system 1, in accordance with an embodiment of the present disclosure.

Referring to FIG. 16, a communication system 1 to which various embodiments of the present disclosure are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

Here, wireless communication technology implemented in wireless devices 100a to 100f of the present disclosure may include Narrowband Internet of Things for low-power communication in addition to LTE, NR, and 6G. In this case, for example, NB-IoT technology may be an example of Low Power Wide Area Network (LPWAN) technology and may be implemented as standards such as LTE Cat NB1, and/or LTE Cat NB2, and is not limited to the name described above. Additionally or alternatively, the wireless communication technology implemented in the wireless devices 100a to 100f of the present disclosure may perform communication based on LTE-M technology. In this case, as an example, the LTE-M technology may be an example of the LPWAN and may be called by various names including enhanced Machine Type Communication (eMTC), and the like. For example, the LTE-M technology may be implemented as at least any one of various standards such as 1) LTE CAT 0, 2) LTE Cat M1, 3) LTE Cat M2, 4) LTE non-Bandwidth Limited (non-BL), 5) LTE-MTC, 6) LTE Machine Type Communication, and/or 7) LTE M, and is not limited to the name described above. Additionally or alternatively, the wireless communication technology implemented in the wireless devices 100a to 100f of the present disclosure may include at least one of Bluetooth, Low Power Wide Area Network (LPWAN), and ZigBee considering the low-power communication, and is not limited to the name described above. As an example, the ZigBee technology may generate personal area networks (PAN) related to small/low-power digital communication based on various standards including IEEE 802.15.4, and the like, and may be called by various names.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 17:
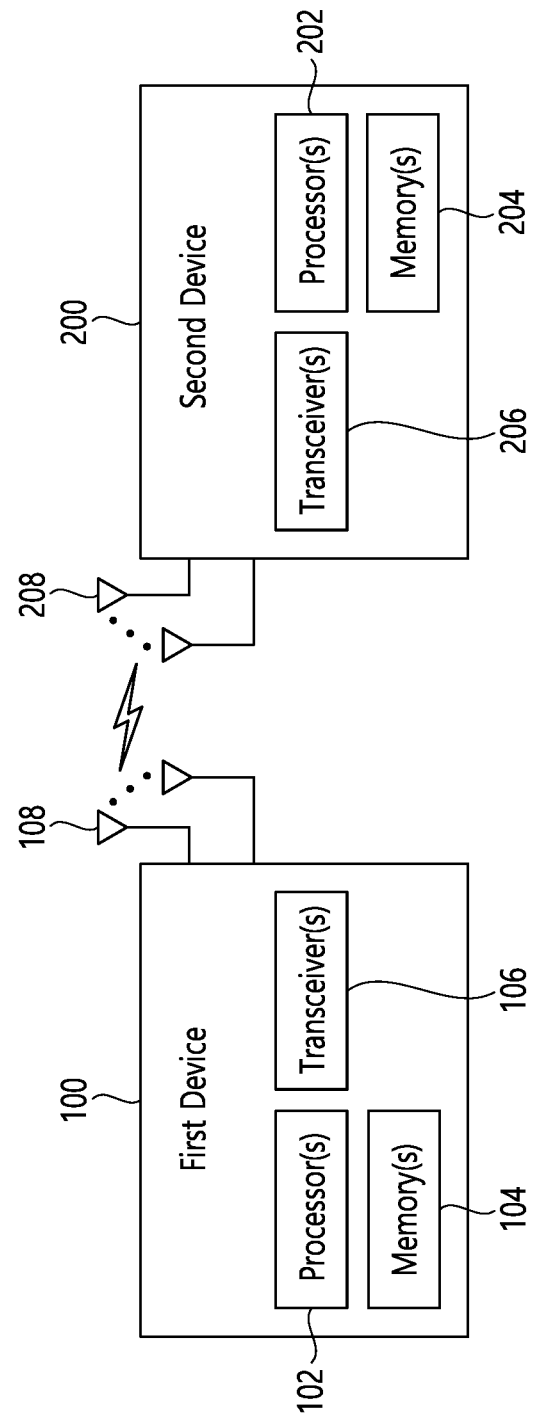
FIG. 17 shows wireless devices, in accordance with an embodiment of the present disclosure.

FIG. 17 shows wireless devices, in accordance with an embodiment of the present disclosure.

Referring to FIG. 17, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 16.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor (s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 18:
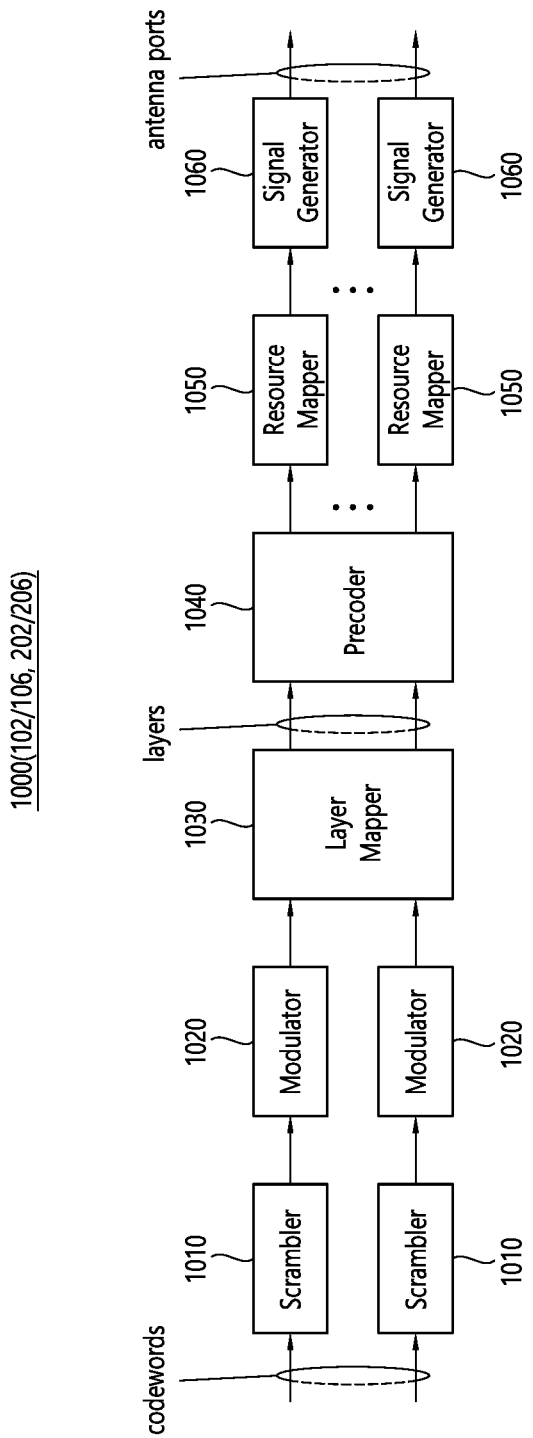
FIG. 18 shows a signal process circuit for a transmission signal, in accordance with an embodiment of the present disclosure.

FIG. 18 shows a signal process circuit for a transmission signal, in accordance with an embodiment of the present disclosure.

Referring to FIG. 18, a signal processing circuit 1000 may include scramblers 1010, modulators 1020, a layer mapper 1030, a precoder 1040, resource mappers 1050, and signal generators 1060. An operation/function of FIG. 18 may be performed, without being limited to, the processors 102 and 202 and/or the transceivers 106 and 206 of FIG. 17. Hardware elements of FIG. 18 may be implemented by the processors 102 and 202 and/or the transceivers 106 and 206 of FIG. 17. For example, blocks 1010 to 1060 may be implemented by the processors 102 and 202 of FIG. 17. Alternatively, the blocks 1010 to 1050 may be implemented by the processors 102 and 202 of FIG. 17 and the block 1060 may be implemented by the transceivers 106 and 206 of FIG. 17.

Codewords may be converted into radio signals via the signal processing circuit 1000 of FIG. 18. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 18. For example, the wireless devices (e.g., 100 and 200 of FIG. 17) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Figure 19:
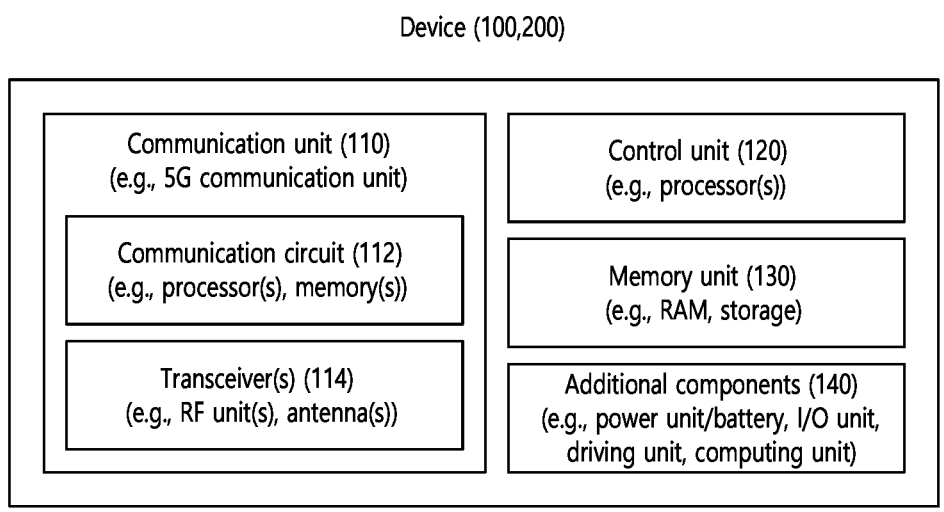
FIG. 19 shows another example of a wireless device, in accordance with an embodiment of the present disclosure.

FIG. 19 shows another example of a wireless device, in accordance with an embodiment of the present disclosure. The wireless device may be implemented in various forms according to a use-case/service (refer to FIG. 16).

Referring to FIG. 19, wireless devices 100 and 200 may correspond to the wireless devices 100 and 200 of FIG. 17 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 17. For example, the transceiver(s) 114 may include the one or more transceivers 106 and 206 and/or the one or more antennas 108 and 208 of FIG. 17. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100*a* of FIG. 16), the vehicles (100*b*-1 and 100*b*-2 of FIG. 16), the XR device (100*c* of FIG. 16), the hand-held device (100*d* of FIG. 16), the home appliance (100*e* of FIG. 16), the IoT device (100*f* of FIG. 16), a digital broadcast terminal, a hologram device, a public safety device, an MTC device, a medicine device, a fintech device (or a finance device), a security device, a climate/environment device, the AI server/device (400 of FIG. 16), the BSs (200 of FIG. 16), a network node, etc. The wireless device may be used in a mobile or fixed place according to a use-example/service.

In FIG. 19, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 19 will be described in detail with reference to the drawings.

Figure 20:
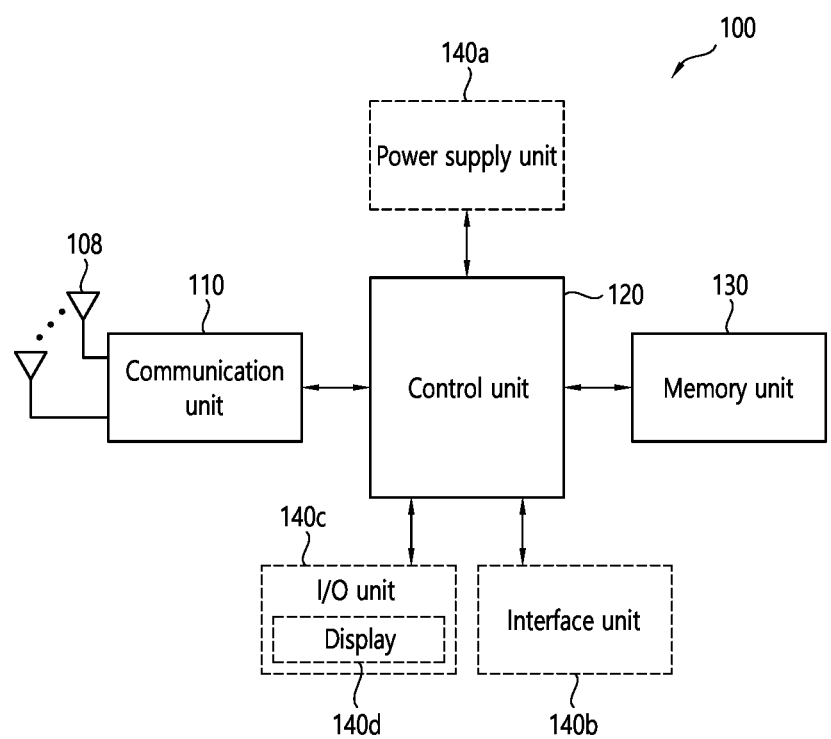
FIG. 20 shows a hand-held device, in accordance with an embodiment of the present disclosure.

FIG. 20 shows a hand-held device, in accordance with an embodiment of the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 20, a hand-held device 100 may include an antenna unit 108, a communication unit 110, a control unit 120, a memory unit 130, a power supply unit 140*a*, an interface unit 140*b*, and an I/O unit 140*c*. The antenna unit 108 may be configured as a part of the communication unit 110. Blocks 110 to 130/140*a* to 140*c* correspond to the blocks 110 to 130/140 of FIG. 19, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140*a* may supply power to the hand-held device 100 and include a wired/wireless charging circuit, a battery, etc. The interface unit 140*b* may support connection of the hand-held device 100 to other external devices. The interface unit 140*b* may include various ports (e.g., an audio I/O port and a video I/O port) for connection with external devices. The I/O unit 140*c* may input or output video information/signals, audio information/signals, data, and/or information input by a user. The I/O unit 140*c* may include a camera, a microphone, a user input unit, a display unit 140*d*, a speaker, and/or a haptic module.

As an example, in the case of data communication, the I/O unit 140*c* may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140*c*.

Figure 21:
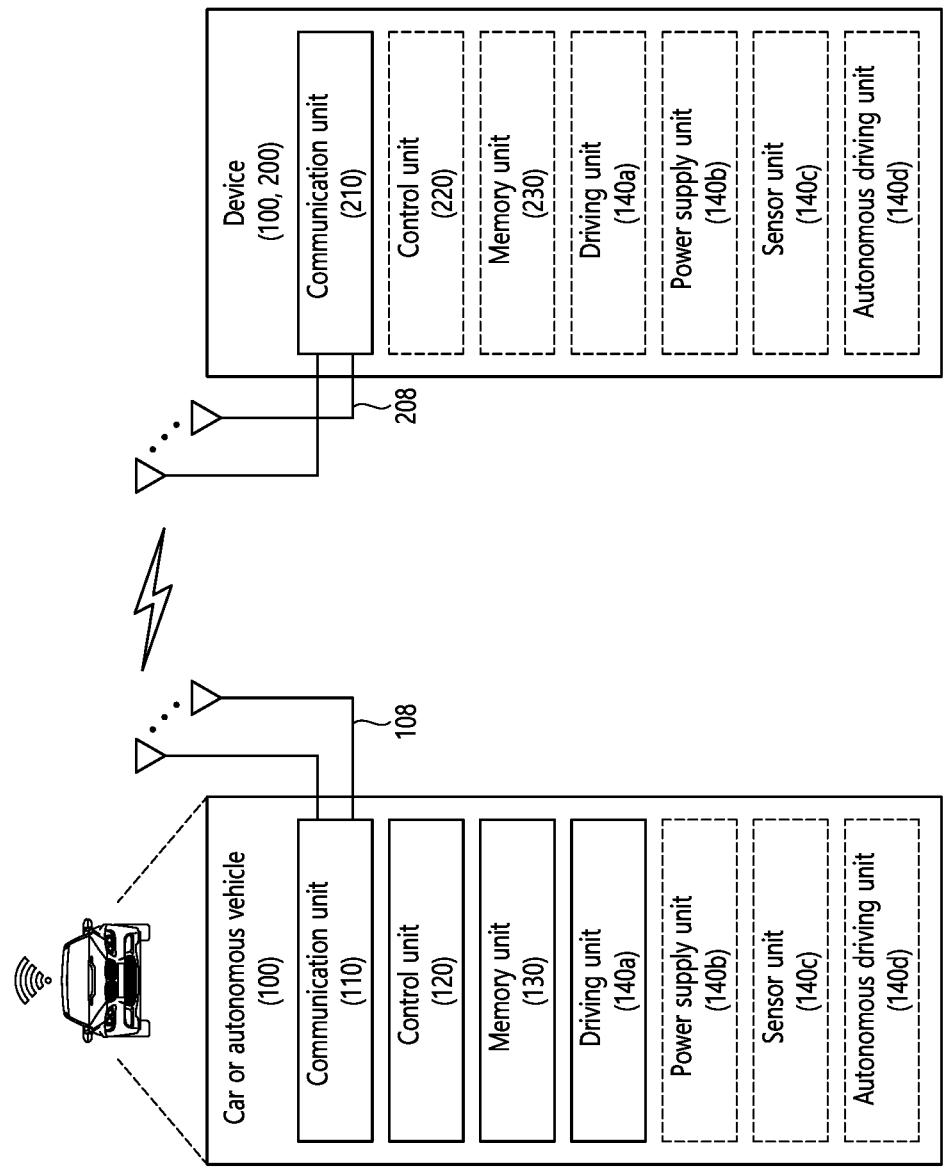
FIG. 21 shows a vehicle or an autonomous vehicle, in accordance with an embodiment of the present disclosure.

FIG. 21 shows a vehicle or an autonomous vehicle, in accordance with an embodiment of the present disclosure. The vehicle or autonomous vehicle may be implemented by a mobile robot, a car, a train, a manned/unmanned Aerial Vehicle (AV), a ship, etc.

Referring to FIG. 21, a vehicle or autonomous vehicle 100 may include an antenna unit 108, a communication unit 110, a control unit 120, a driving unit 140*a*, a power supply unit 140*b*, a sensor unit 140*c*, and an autonomous driving unit 140*d*. The antenna unit 108 may be configured as a part of the communication unit 110. The blocks 110/130/140*a* to 140*d* correspond to the blocks 110/130/140 of FIG. 19, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous vehicle 100. The control unit 120 may include an Electronic Control Unit (ECU). The driving unit 140*a* may cause the vehicle or the autonomous vehicle 100 to drive on a road. The driving unit 140*a* may include an engine, a motor, a powertrain, a wheel, a brake, a steering device, etc. The power supply unit 140*b* may supply power to the vehicle or the autonomous vehicle 100 and include a wired/wireless charging circuit, a battery, etc. The sensor unit 140*c* may acquire a vehicle state, ambient environment information, user information, etc. The sensor unit 140*c* may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140*d* may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140*d* may generate an autonomous driving path and a driving plan from the obtained data. The control unit 120 may control the driving unit 140*a* such that the vehicle or the autonomous vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140*c* may obtain a vehicle state and/or surrounding environment information. The autonomous driving unit 140*d* may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous vehicles and provide the predicted traffic information data to the vehicles or the autonomous vehicles.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A method comprising:
reserving, by a first device, a plurality of first sidelink transmission resources;
transmitting, by the first device, to a second device, sidelink data on at least one first sidelink transmission resource among the plurality of first sidelink transmission resources;
selecting, by the first device, a plurality of second sidelink transmission resources for a transmission of the sidelink data to the second device, based on (i) the second device failing to decode the sidelink data on the plurality of first sidelink transmission resources and (ii) the sidelink data not being transmitted to the second device on at least one second sidelink transmission resource among the plurality of first sidelink transmission resources, due to prioritization between the sidelink data and other data; and
transmitting, by the first device, the sidelink data to the second device, based on the plurality of second sidelink transmission resources.

2. The method of claim 1, wherein the sidelink data is not transmitted to the second device on the at least one second sidelink transmission resource among the plurality of first sidelink transmission resources, based on a first priority related to the sidelink data being lower than a second priority related to an uplink transmission to a base station.

3. The method of claim 1, wherein the plurality of first sidelink transmission resources and the plurality of second sidelink transmission resources are for sidelink communication based on sidelink mode 2.

4. The method of claim 3, wherein resource pool information and information regarding the prioritization, for transmitting the sidelink data to the second device, are transferred from a medium access control layer to a physical layer of the first device.

5. The method of claim 1, wherein a maximum number of sidelink hybrid automatic repeat request transmissions of a transport block is configured based on quality of service information of the transport block for transmitting the sidelink data to the second device.

6. The method of claim 5, wherein the maximum number of sidelink hybrid automatic repeat request transmissions is included in a radio resource control message received from a base station.

7. The method of claim 5, wherein the quality of service information includes priority information based on a sidelink logical channel related to the transport block.

8. The method of claim 5, wherein sum of a number of the plurality of first sidelink transmission resources and a number of the plurality of second sidelink transmission resources is lower than or equal to the maximum number of sidelink hybrid automatic repeat request transmissions.

9. The method of claim 1, wherein the plurality of second sidelink transmission resources are selected within a range which does not exceed packet delay budget for the sidelink data.

10. The method of claim 1, wherein triggering for the selection of the plurality of second sidelink transmission resources is performed before an end time point of the plurality of first sidelink transmission resources.

11. A first device comprising:
at least one transceiver;
at least one processor; and
at least one memory connected to the at least one processor and storing instructions that, based on being executed, cause the first device to perform operations comprising:
reserving a plurality of first sidelink transmission resources;
transmitting to a second device, sidelink data on at least one first sidelink transmission resource among the plurality of first sidelink transmission resources;
selecting a plurality of second sidelink transmission resources for a transmission of the sidelink data to the second device, based on (i) the second device failing to decode the sidelink data on the plurality of first sidelink transmission resources and (ii) the sidelink data not being transmitted to the second device on at least one second sidelink transmission resource among the plurality of first sidelink transmission resources, due to prioritization between the sidelink data and other data; and
transmitting the sidelink data to the second device, based on the plurality of second sidelink transmission resources.

12. The first device of claim 11, wherein the sidelink data is not transmitted to the second device on the at least one second sidelink transmission resource among the plurality of first sidelink transmission resources, based on a first priority related to the sidelink data being lower than a second priority related to an uplink transmission to a base station.

13. The first device of claim 11, wherein the plurality of first sidelink transmission resources and the plurality of second sidelink transmission resources are for sidelink communication based on sidelink mode 2.

14. A device adapted to control a first user equipment, the device comprising:
at least one processor; and
at least one memory connected to the at least one processor and storing instructions that, based on being executed, cause the first user equipment to perform operations comprising:
reserving a plurality of first sidelink transmission resources;
transmitting to a second user equipment, sidelink data on at least one first sidelink transmission resource among the plurality of first sidelink transmission resources;
selecting a plurality of second sidelink transmission resources for a transmission of the sidelink data to the second user equipment, based on (i) the second user equipment failing to decode the sidelink data on the plurality of first sidelink transmission resources and (ii) the sidelink data not being transmitted to the second user equipment on at least one second sidelink transmission resource among the plurality of first sidelink transmission resources, due to prioritization between the sidelink data and other data; and
transmitting the sidelink data to the second user equipment, based on the plurality of second sidelink transmission resources.

* * * * *